United States Patent
Yamamoto

(10) Patent No.: US 7,995,291 B2
(45) Date of Patent: Aug. 9, 2011

(54) IMAGE READING LENS SYSTEM AND IMAGE READING APPARATUS

(75) Inventor: Yoko Yamamoto, Fuchu (JP)

(73) Assignee: Fujinon Corporation, Saitama-shi (JP)

( * ) Notice: Subject to any disclaimer, the term of this patent is extended or adjusted under 35 U.S.C. 154(b) by 83 days.

(21) Appl. No.: 12/362,014

(22) Filed: Jan. 29, 2009

(65) Prior Publication Data

US 2009/0219630 A1    Sep. 3, 2009

(30) Foreign Application Priority Data

Feb. 28, 2008 (JP) ................ P2008-048605

(51) Int. Cl.
*G02B 9/60* (2006.01)
*G02B 9/62* (2006.01)
*G02B 13/18* (2006.01)

(52) U.S. Cl. ......... 359/770; 359/761; 359/713; 359/714
(58) Field of Classification Search .......... 359/754–756, 359/713
See application file for complete search history.

(56) References Cited

U.S. PATENT DOCUMENTS

| | | | |
|---|---|---|---|
| 6,977,778 B2 * | 12/2005 | Nose et al. | 359/680 |
| 6,989,946 B2 * | 1/2006 | Kobayashi et al. | 359/754 |
| 7,301,578 B2 * | 11/2007 | Ohzawa et al. | 348/340 |
| 7,319,563 B2 * | 1/2008 | Yoshitsugu | 359/689 |
| 7,471,465 B2 * | 12/2008 | Yamashita et al. | 359/770 |
| 7,483,221 B2 * | 1/2009 | Kitahara | 359/760 |
| 7,586,694 B2 * | 9/2009 | Chen et al. | 359/794 |
| 2002/0135890 A1 | 9/2002 | Tochigi | |
| 2004/0264008 A1 | 12/2004 | Nishina | |
| 2006/0083504 A1 * | 4/2006 | Matsusaka | 396/72 |
| 2007/0236811 A1 * | 10/2007 | Mori | 359/770 |

FOREIGN PATENT DOCUMENTS

JP    2005-17506 A    1/2005
JP    3740370 B2    11/2005

* cited by examiner

*Primary Examiner* — Jordan M Schwartz
(74) *Attorney, Agent, or Firm* — Birch, Stewart, Kolasch & Birch, LLP

(57) ABSTRACT

An image reading lens system of Example 1 includes six lenses having first to sixth lenses being arranged in order from an object side and an aperture diaphragm. In the image reading lens system, the first lens, the third lens, and the sixth lens are formed of negative lenses, and the second lens, the fourth lens, and the fifth lens are formed of positive lenses. The first lens, the second lens, the third lens, and the fifth lens are made of glass, and surfaces of all these lenses are formed of spherical surfaces. The fourth lens and the sixth lens are made of resin, and surfaces of the fourth lens and surfaces of the sixth lens are formed of aspheric surfaces. A cemented lens is formed of the second lens and the third lens with a cemented surface interposed therebetween, and is disposed adjacent to the aperture diaphragm.

12 Claims, 17 Drawing Sheets

IMAGE READING LENS SYSTEM AND IMAGE READING APPARATUS

CROSS-REFERENCE TO RELATED APPLICATIONS

This application is based upon and claims the benefit of priority from the Japanese Patent Application No.2008-48605 filed on Feb. 28, 2008; the entire contents of which are incorporated herein by reference.

BACKGROUND OF THE INVENTION

1. Technical Field

The invention relates to an image reading apparatus such as an image scanner and an image reading lens system mounted on the image reading apparatus.

2. Description of the Related Art

Recently, image reading apparatuses for scanning an original such as a document or an image and reading the original as digital image data has come into widespread use. Known image reading apparatuses include a copier, a facsimile, an image scanner, and a multi-function device having these functions and the like. These image reading apparatuses irradiate light onto an original placed on a given position to form an image of the original on a solid-state imaging device such as CCD by using light reflected from the original through a lens system, thereby obtaining image data for accurately reproducing the original.

In order to downsize the image reading apparatus, a lens (hereinafter, may be referred to as an "image reading lens system") mounted on the image reading apparatus is provided near an original. Thus, a wide angle of view is required for the lens system. Furthermore, in order to obtain image data for accurately reproducing an original, the image reading lens system is required to have a high resolving power and have small aberrations with an excellent balance.

Recently, accompanied with a decrease in size of the image reading apparatuses, a reduction in cost of the image reading apparatuses, and an increase in resolution of the image reading apparatuses, the image reading lens system is further required a decrease in its size, a reduction in its cost, and an increase in its resolving power.

As an example of an image reading lens system for achieving a wide angle of view and a high resolving power, JP 2005-17506 A (corresponding to US 2004/0264008 A) and Japanese Patent No.3740370 (corresponding US 2002/0135890 A) have proposed six-lens configurations.

The image reading lens system described in JP 2005-17506 A and Japanese Patent No.3740370 exhibit excellent optical performance in an angular range where a half angle of view is about 25 degrees or less, but a field curvature increases in an angle of view greater than that range. In this point of view, when the image reading lens system described in JP 2005-17506 A and Japanese Patent No.3740370 is used, it is necessary to secure a spacing between the image reading lens system and an original so that the entire size of the original is included in the range of the half angle of view of 25 degrees or less.

Accordingly, a size of the image reading apparatus is restricted by the spacing between the original and the image reading lens system. Thus, there arises a problem that it is difficult to further decrease a size thereof. Conversely, when priority is given to a decrease in size of the image reading apparatus, the spacing between the original and the image reading lens system should be small. However, in this case, there arises another problem that a size of an original which can be read with a fine image quality is restricted to be relatively small.

Furthermore, since a high-intensity light source for illuminating an original is disposed close to the image reading lens system, the image reading lens system tends to be affected by heat generated in the high-intensity source. Accordingly, when the image reading lens system includes a lens made of resin, a focus tends to be changed due to thermal expansion. On the other hand, when the image reading lens system includes a glass mold lens having small thermal expansion, a focus is scarcely changed due to thermal expansion. However, the glass mold lens should be used even in a lens having an aspheric surface in order to correct aberrations. Thus, costs of the image reading lens system and the image reading apparatus increase.

Moreover, JP 2005-17506 A and Japanese Patent No.3740370 describe that image reading lens systems have an F number of 4.99 to 5.04. However, in order to increase a speed of reading an original while keeping a high resolving power, it is required for an image reading lens system to be faster than those lens systems and to suppress aberrations.

SUMMARY OF THE INVENTION

The invention has been made in view of the above circumstances, and provides a low-cost, compact, and fast image reading lens system that can suppress focus movement due to temperature variation and includes a first lens having a negative refractive power and at least two aspheric surfaces, thereby exhibiting an excellent optical performance even in a wide angle range where a half angle of view is greater than 25 degrees. Furthermore, the invention provides a low-cost and small-sized image reading apparatus for reading a larger original with high resolution, on which the image reading lens system is mounted.

According to an aspect of the invention, an image reading lens system includes six lenses and a stop. The six lenses include a first lens, a second lens, a third lens, a fourth lens, a fifth lens, and a sixth lens that are arranged in order from an object side. The six lenses include a negative lens that is made of a resin and has at least one aspheric surface, and a positive lens that is made of a resin and has at least one aspheric surface. The six lenses include a cemented lens that is adjacent to the stop and is formed by cementing a positive lens and a negative lens that are adjacent to each other. The first lens has a negative refractive power.

Also, the sixth lens may have a negative refractive power.

Also, the stop may be disposed between the third lens and the fourth lens. The third lens may have a negative refractive power. The second lens, the fourth lens, and the fifth lens may have positive refractive powers, respectively. The cemented lens may be formed of the second lens and the third lens.

Also, the first lens may be the negative lens, which is made of the resin and has the at least one aspheric surface.

Also, the sixth lens may be the negative lens, which is made of the resin and has the at least one aspheric surface.

Also, the fourth lens may be the positive lens, which is made of the resin and has the at least one aspheric surface.

Also, the fifth lens may be the positive lens, which is made of the resin and has the at least one aspheric surface.

Also, the following conditional expression may be satisfied:

$$-3.37 < f1/f < -0.85$$

where f denotes a focal length of the whole system, and f1 denotes a focal length of the first lens.

Also, the following conditional expression may be satisfied:

$$0.32 < f5/f < 1.74$$

where f denotes a focal length of the whole system, and f5 denotes a focal length of the fifth lens.

Also, the following conditional expression may be satisfied:

$$0.29 < R3/f < 0.67$$

where f denotes a focal length of the whole system, and R3 denotes a radius of curvature of an object-side surface of the second lens.

Also, the following conditional expression may be satisfied:

$$0.04 < D8/f < 0.28$$

where f denotes a focal length of the whole system, and D8 denotes a center thickness of the fourth lens.

Also, the following conditional expression may be satisfied:

$$0.02 < D11/f < 0.45$$

where f denotes a focal length of the whole system, and D11 denotes a space from an image-side surface of the fifth lens to an object-side surface of the sixth lens on the optical axis.

According to another aspect of the invention, an image reading apparatus includes the image reading lens system set forth above.

With the above configuration, it is possible to provide a low-cost and compact image reading lens system that can suppress focus movement due to temperature variation and exhibit an excellent optical performance even in the wide angle range where a half angle of view is greater than 25 degrees. Further, by using the image reading lens system, it is possible to provide a small-sized image reading apparatus without restriction in a size of an original to be read.

DETAILED DESCRIPTION OF EMBODIMENTS OF THE INVENTION

Figure 1:
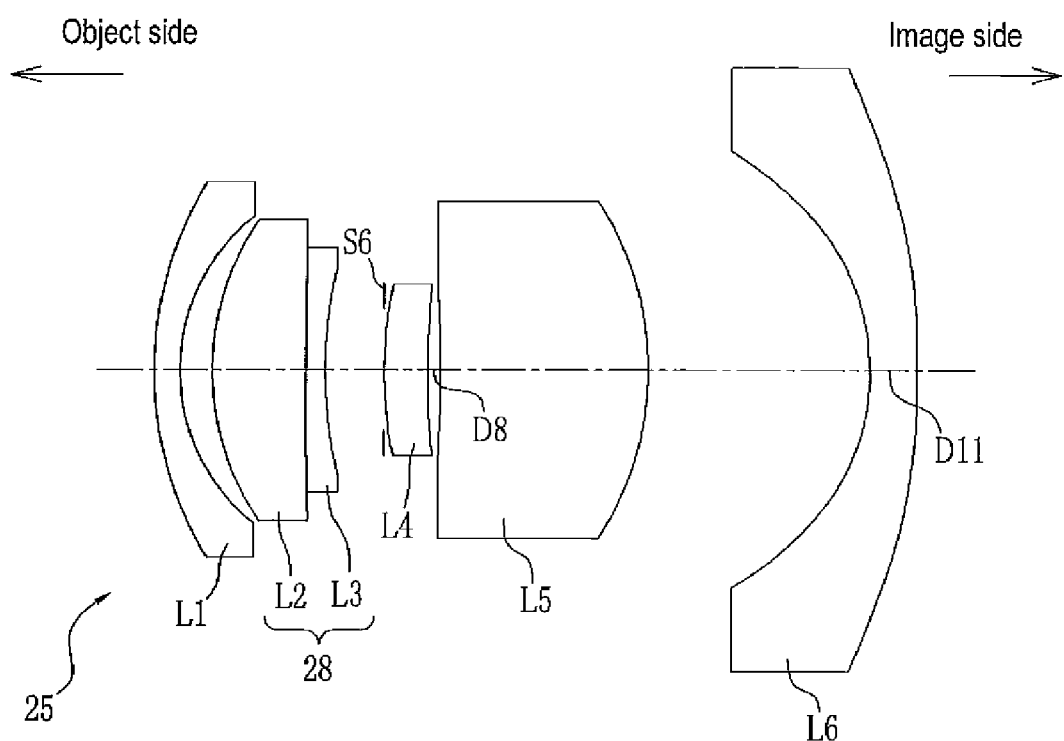
FIG. 1 is a section view illustrating the configuration of an image reading lens system.

As shown in FIG. 1, an image reading lens system 25 includes six lenses and an aperture diaphragm S6. Specifically, there are arranged, in order from an object side, a front group including three lenses, an aperture diaphragm S6, and a rear group including three lenses. The six lenses constituting the image reading lens system 25 are hereinafter referred to as first to sixth lenses L1 to L6 in order from the object side. That is, a lens on the most object side is referred to as the first lens L1, and a lens the most image side is referred to as the sixth lens L6. The front group includes the first lens L1, the second lens L2, the third lens L3, and the rear group includes the fourth lens L4, the fifth lens L5, the sixth lens L6.

The image reading lens system 25 is configured so that any of the first to sixth lenses L1 to L6 is formed of a positive lens that is made of a resin and has at least one aspheric surface, and that any of the first to sixth lenses L1 to L6 is formed of a negative lens that is made of a resin and has at least one aspheric surface.

The first lens L1 is formed of a negative meniscus lens having a convex surface directed to the object side. The second lens L2 is formed of a positive lens, and the third lens L3 is formed of a negative lens. Furthermore, an image-side surface of the second lens L2 and an object side of the third lens L3 are cemented to form a cemented lens 28. The fourth lens L4 is formed of a positive lens, the fifth lens L5 is formed of a positive lens, and the sixth lens L6 is formed of a negative lens. The aperture diaphragm S6 is disposed between the third lens L3 and the fourth lens L4.

Moreover, it is assumed that a focal length of the whole image reading lens system 25 is f, that a focal length of the first lens L1 is f1, that a focal length of the fifth lens L5 is F5, that a radius of curvature of the object-side surface of the second lens L2 is R3, that a center thickness of the fourth lens L4 is D8, and that a spacing (distance) on an optical axis from the image-side surface of the fifth lens L5 to the object-side surface of the sixth lens L6 is D11. Under these assumptions, the image reading lens system 25 is configured to satisfy the following conditional expressions (1) to (5):

$$-3.37 < f1/f < -0.85 \quad (1)$$

$$0.32 < f5/f < 1.74 \quad (2)$$

$$0.29 < R3/f < 0.67 \quad (3)$$

$$0.04 < D8/f < 0.28 \quad (4)$$

$$0.02 < D11/f < 0.45 \quad (5)$$

The conditional expression (1) relates to the focal length of the first lens L1. If F1/f exceeds the upper limit of the conditional expression (1), it becomes difficult to satisfactorily correct the comatic aberration. Conversely, if f1/f falls below the lower limit of the conditional expression (1), it becomes difficult to satisfactorily correct the field curvature. Accordingly, it is preferable that f1/f satisfies the conditional expression (1), and it is more preferable that f1/f satisfies $-3.28 < f1/f < -0.94$. Moreover, it is further more preferable that f1/f satisfies $-3.21 < f1/f < -1.01$, and it is still further more preferable that f1/f satisfies $-3.12 < f1/f < -1.10$.

The conditional expression (2) relates to the focal length of the fifth lens L5. If F5/f exceeds the upper limit of the conditional expression (2), it becomes difficult to satisfactorily correct the distortion. Conversely, if f5/f falls below the lower limit of the conditional expression (2), it becomes difficult to satisfactorily correct the comatic aberration. Accordingly, it is preferable that f5/f satisfies the conditional expression (2), and it is more preferable that f5/f satisfies $0.38 < f5/f < 1.68$. Moreover, it is further more preferable that f5/f satisfies $0.44 < f5/f < 1.62$, and it is still further more preferable that f5/f satisfies $0.50 < f5/f < 1.56$.

The conditional expression (3) relates to the curvature of the object-side surface of the second lens L2. If R3/f exceeds the upper limit of the conditional expression (3), it becomes difficult to satisfactorily correct the lateral chromatic aberration. Conversely, if R3/f falls below the lower limit of the conditional expression (3), it becomes difficult to satisfactorily correct the comatic aberration. Accordingly, it is preferable that R3/f satisfies the conditional expression (3), and it is more preferable that R3/f satisfies $0.31 < R3/f < 0.65$. Moreover, it is further more preferable that R3/f satisfies $0.33 < R3/f < 0.63$, and it is still further more preferable that R3/f satisfies $0.35 < R3/f < 0.61$.

The conditional expression (4) relates to the center thickness of the fourth lens L4. If D8/f exceeds the upper limit of the conditional expression (4), it becomes difficult to satisfactorily the distortion. Conversely, if D8/f falls below the lower limit of the conditional expression (4), it becomes difficult to satisfactorily correct the lateral chromatic aberration. Accordingly, it is preferable that D8/f satisfies the conditional expression (4), and it is more preferable that D8/f satisfies $0.05 < D8/f < 0.27$. Moreover, it is further more preferable that D8/f satisfies $0.06 < D8/f < 0.26$, and it is still further more preferable that D8/f satisfies $0.06 < D8/f < 0.25$.

The conditional expression (5) relates to the spacing on the optical axis from the image-side surface of the fifth lens L5 to the object-side surface of the sixth lens L6. If D11/f exceeds the upper limit of the conditional expression (5), it becomes difficult to satisfactorily correct the distortion. Conversely, if D11/f falls below the lower limit of the conditional expression (5), it becomes difficult to satisfactorily correct the field curvature. Accordingly, it is preferable that D11/f satisfies the conditional expression (5), and it is more preferable that D11/f satisfies $0.04 < D11/f < 0.43$. Moreover, it is further more preferable that D11/f satisfies $0.07 < D11/f < 0.40$, and it is still further more preferable that D11/f satisfies $0.09 < D11/f < 0.38$.

The first to sixth lenses L1 to L6 in the image reading lens system 25 include the positive lens, which is made of the resin and has the at least one aspheric surface, and the negative lens, which is made of the resin and has the at least one aspheric surface. In addition, the first lens L1 has the negative refractive power. With such a configuration, it is possible to achieve a wide angle of view where a half angle of view is greater than 25 degrees. Additionally, the field curvature is satisfactorily corrected even in the wide angle range where the half angle of view is greater than 25 degrees.

Moreover, (i) focus movement caused by temperature variation of the positive lens, which is made of the resin and has the at least one aspheric surface, and (ii) focus movement caused by temperature variation of the negative lens, which is made of the resin and has the at least one aspheric surface, cancel each other out. Thus, it is possible to suppress focus movement due to temperature variation in the image reading lens system 25 as a whole.

In the image reading lens system 25, the cemented lens 28 is disposed to be adjacent to the aperture diaphragm S6. Thus, it is possible to satisfactorily correct the longitudinal chromatic aberration.

Furthermore, in order to sufficiently secure the suppression effect of the above mentioned focus movement due to temperature variation and to satisfactorily correct the longitudinal chromatic aberration, it is preferable that a material having an Abbe number of 50 or more is used in the positive lens, which is made of the resin and has the at least one aspheric surface, and that a material having an Abbe number of 35 or less is used in the negative lens, which is made of the resin and has the at least one aspheric surface.

Furthermore, two positive lenses are disposed on the rear side (the image side) of the aperture diaphragm S6. Thus, it is possible to further satisfactorily correct the spherical aberration.

Moreover, the image reading lens system 25 is configured so that the first lens L1 disposed on the most object side has the negative refractive power, and the sixth lens L6 disposed on the most object side has the negative refractive power. Thus, it is possible to satisfactorily correct the field curvature while achieving its compactness.

Hereinafter, specific examples of the image reading lens system 25 will be described with reference to numerical values in Examples 1 to 8. Furthermore, in Examples 1 to 8, the respective surfaces (including the aperture diaphragm S6) of the image reading lens system are represented by Si (i=1 to 12) in order from the object-side surface of the first lens L1. The cemented surface of the second lens L2 and the third lens L3 is represented by the surface S4, and the aperture diaphragm S6 is represented by the surface S6.

Also, a spacing (a spacing between the surface Si and the surface Si+1 on the optical axis) between the surfaces Si adjacent to each other is represented by an on-axis surface spacing Di (i=1 to 11).

EXAMPLE 1

Figure 2:
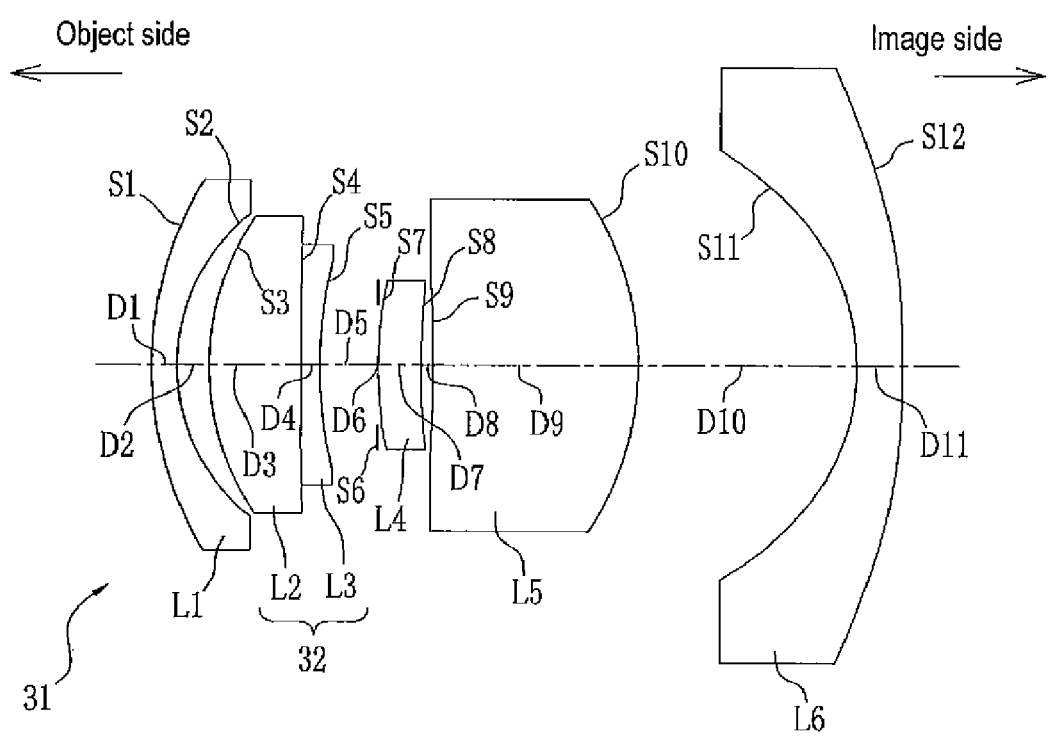
FIG. 2 is a section view illustrating an image reading lens system according to Example 1.

As shown in FIG. 2, an image reading lens system 31 according to Example 1 includes six lenses having first to sixth lenses L1 to L6 that are arranged in order from the object side and an aperture diaphragm S6. The aperture diaphragm S6 is disposed between the third lens L3 and the fourth lens L4. Specifically, in the image reading lens system 31, there are arranged, in order from the object side, a front group (the first lens L1, the second lens L2, and the third lens L3), the aperture diaphragm S6, and a rear group (the fourth lens L4, the fifth lens L5, and the sixth lens L6). In addition, the second lens L2 and the third lens L3 form a cemented lens 32.

In the image reading lens system 31, the first lens L1, the third lens L3, and the sixth lens L6 are formed of negative lenses, and the second lens L2, the fourth lens L4, and the fifth lens L5 are formed of positive lenses.

As lens data of the image reading lens system 31, Table 1 shows a radius of curvature Ri (mm) of each surface Si, an on-axis surface spacing Di (mm), a refractive power Ndj of each lens Lj at the d-line (587.6 nm), and an Abbe number vdj of each lens Lj. Here, j (j=1 to 6) denotes a lens number.

TABLE 1

| Si (Surface number) | Ri (Radius of curvature) | Di (Surface spacing) | Ndj (Refractive index) | vdj (Abbe number) |
|---|---|---|---|---|
| 1 | 18.98 | 1.34 | 1.59551 | 39.2 |
| 2 | 10.16 | 1.73 | | |
| 3 | 14.17 | 4.90 | 1.83481 | 42.7 |
| 4 | 369.49 | 0.99 | 1.84666 | 23.8 |
| 5 | 22.54 | 3.09 | | |
| 6 | (AD*) | 0.01 | | |
| 7* | 22.47 | 2.27 | 1.53112 | 55.4 |
| 8* | 48.26 | 0.64 | | |
| 9 | −91.65 | 10.90 | 1.75500 | 52.3 |
| 10 | −16.30 | 11.58 | | |
| 11* | −14.05 | 2.46 | 1.58364 | 30.2 |
| 12* | −85.64 | | | |

| | |
|---|---|
| Focal length of the whole system f (mm) | 31.4 |
| F number | 4.5 |
| Imaging magnification β | −0.220 |
| Angle of view 2ω (degrees) | 79.4 |

*AD: Aperture diaphragm

As shown in Table 1, each lens in the image reading lens system 31 has different material. The first lens L1, the second lens L2, the third lens L3, and the fifth lens L5 are made of glass, and surfaces of all these lenses are formed of spherical surfaces. On the other hand, in the image reading lens system 31, the fourth lens L4 and the sixth lens L6 are made of resin, and the surfaces S7 and S8 of the fourth lens L4 and the surfaces S11 and S12 of the sixth lens L6 are formed of aspheric surfaces.

Further, the focal length f of the whole system of the image reading lens system 31 is 31.4 (mm), the F number is 4.5, the imaging magnification β is −0.220 (times), and the angle of view 2ω is 79.4 (degrees) (see Table 1).

Specific shapes of the aspheric surfaces S7, S8, S11, and S12 of the fourth lens L4 and sixth lens L6 are represented by the following numerical expression 1. Here, Z denotes a depth (mm) of an aspheric surface, and h denotes a distance (mm) from the optical axis to the lens surface, KA denotes a conic constant, C denotes a paraxial curvature (=1/R, R: paraxial radius of curvature), and Bi denotes an i-th order aspheric coefficient (i=3 to 10). Specific aspheric coefficients of the surfaces S7, S8, S11, and S12 of the image reading lens system 31 are shown in Table 2.

$$Z = \frac{C \cdot h^2}{1 + \sqrt{1 - KA \cdot C^2 \cdot h^2}} + \sum_{i=3}^{10} B_i \cdot h^i \quad \text{[Numerical Expression 1]}$$

TABLE 2

| Aspheric coefficient | 7th surface (S7) | 8th surface (S8) | 11th surface (S11) | 12th surface (S12) |
|---|---|---|---|---|
| KA | 9.969E−01 | 1.000E+00 | 1.000E+00 | 1.000E+00 |
| $B_3$ | 8.346E−06 | −9.930E−05 | −9.658E−04 | −9.484E−04 |
| $B_4$ | 9.859E−06 | 1.711E−04 | −2.778E−05 | 1.027E−06 |
| $B_5$ | 2.831E−05 | −2.352E−05 | 3.558E−06 | 9.595E−07 |
| $B_6$ | −8.065E−06 | 6.034E−07 | −3.003E−07 | 9.006E−08 |
| $B_7$ | −6.517E−07 | 4.713E−07 | 1.003E−09 | 4.936E−10 |
| $B_8$ | 4.165E−07 | 2.772E−08 | 1.526E−09 | −1.723E−10 |
| $B_9$ | 1.014E−07 | −9.005E−09 | 1.509E−10 | −9.511E−12 |
| $B_{10}$ | −2.960E−08 | −3.832E−10 | −1.137E−11 | 4.330E−13 |

TABLE 3

| | |
|---|---|
| (1) f1/f | −1.24 |
| (2) f5/f | 0.784 |
| (3) R3/f | 0.45 |
| (4) D8/f | 0.07 |
| (5) D11/f | 0.37 |

As shown in Table 3, the image reading lens system 31 has the following specifications: f1/f=−1.24, f5/f=0.784, R3/f=0.45, D8/f=0.07, and D11/f=0.37. That is, the image reading lens system 31 is configured to satisfy the above-mentioned conditional expressions (1) to (5).

Figure 3:
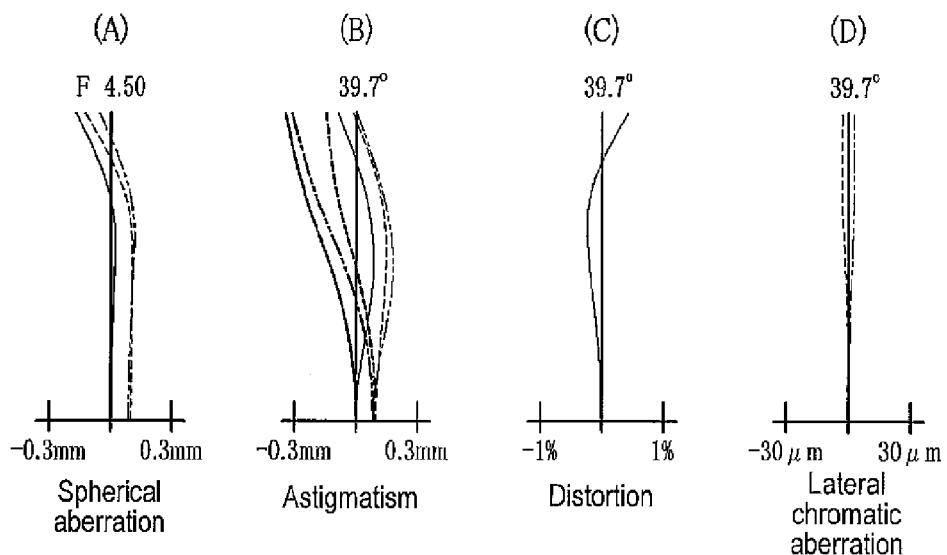
FIG. 3 is an aberration diagram illustrating the spherical aberration, astigmatism, distortion, and lateral chromatic aberration of the image reading lens system according to Example 1.
Figure 4:
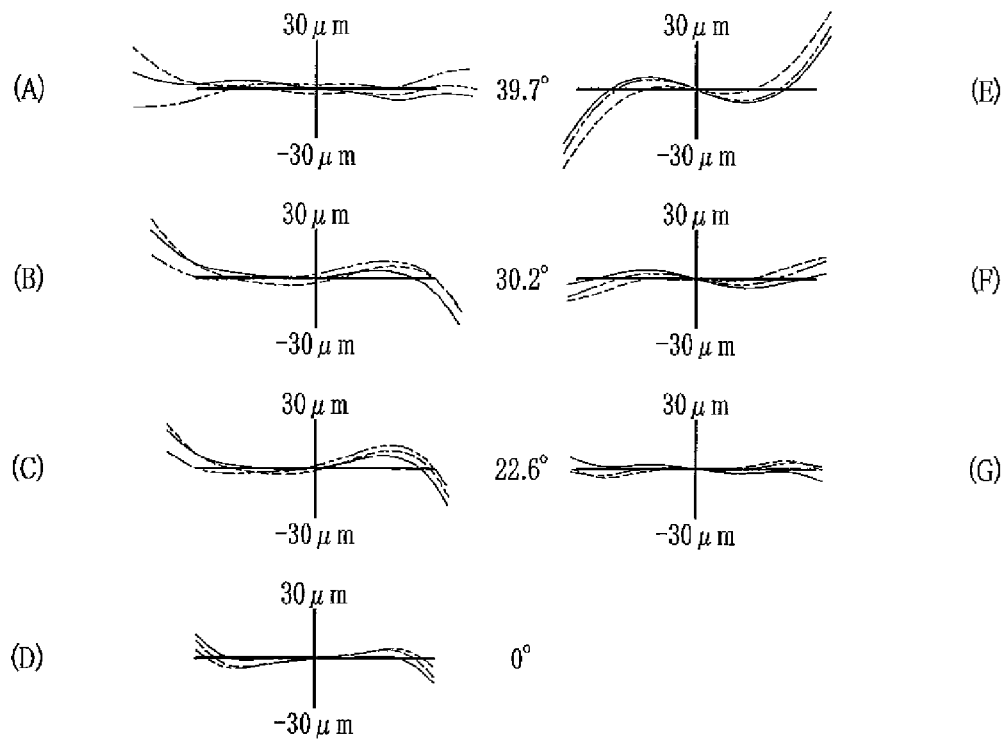
FIG. 4 is an aberration diagram illustrating the comatic aberration of the image reading lens system according to Example 1.

FIGS. 3 and 4 show various aberrations of the image reading lens system 31 in the case where a plane parallel glass plate (a thickness of 2.0 mm) serving as an original-document platen of an image reading apparatus is disposed on the object side of the image reading lens system 31, and a plane parallel glass plate (a thickness of 1.1 mm) serving as a cover glass of a CCD mounted on the image reading apparatus is disposed on the image side of the image reading lens system 31.

Furthermore, FIG. 3(A) shows the spherical aberration of the image reading lens system 31, FIG. 3(B) shows the astigmatism thereof, FIG. 3(C) shows the distortion thereof, and FIG. 3(D) shows the lateral chromatic aberration thereof. In the graph of the spherical aberration, the solid line represents the spherical aberration at the e-line (a wavelength of 546.1 nm), the dashed line represents the spherical aberration at the g-line (a wavelength of 435.8 nm), and the chain double-dashed line represents the spherical aberration at the C-line (a wavelength of 656.3 nm). Likewise, in the graph of the astigmatism, the solid line represents the astigmatism at the e-line, the dashed line represents the astigmatism at the g-line, and the chain double-dashed line represents the astigmatism at the C-line. In addition, the thick lines represent the sagittal astigmatism (aberration in S direction) at the e-line, the g-line, and the C-line, respectively, and the thin lines represent the tangential astigmatism (aberration in T direction) at the e-line, the g-line, and the C-line, respectively. In the graph of the lateral chromatic aberration, the e-line is set as a reference, the dashed line represents the lateral chromatic aberration at the g-line, and the chain double-dashed line represents the lateral chromatic aberration at the C-line.

In addition, FIGS. 4(A) to 4(D) show the tangential coma aberrations (aberration in T direction) at a half angle of view ω (degrees)=39.7, 30.2, 22.6, and 0, respectively. Likewise, FIGS. 4(E) to 4(G) show the sagittal coma aberrations (aberration in S direction) at a half angle of view ω (degrees)=39.7, 30.2, and 22.6, respectively. Also in these comatic aberrations, the solid line represents the comatic aberration at the e-line, the dashed line represents the comatic aberration at the g-line, and the chain double-dashed line represents the comatic aberration at the C-line.

Furthermore, lens data of the image reading lens systems according to Examples 2 to 8 to be described later have the same items and units as the lens data in Example 1. Similarly to Example 1, aberrations in Examples 2 to 8 are aberrations under the following environment. That is, a plane parallel glass plate (a thickness of 2.0 mm) serving as an original-document platen of an image reading apparatus is disposed on the object side of the image reading lens system 31, and a plane parallel glass plate (a thickness of 1.1 mm) serving as a cover glass of a CCD mounted on the image reading apparatus is disposed on the image side of the image reading lens system. Moreover, notation of the spherical aberration, the astigmatism, the distortion, and the lateral chromatic aberration in Example 1 is similarly applied to aberration diagrams in Examples 2 to 8 to be described later. Although exemplary values of the half angle of view ω corresponding to Examples 2 to 8 are different, respectively, notation such as line type of the comatic aberration in Example 1 is also similarly applied to the comatic aberration in Examples 2 to 8.

The image reading lens system 31 is configured so that the fourth lens L4 and the sixth lens L6 are formed of the aspheric lenses, and the first lens L1 has the negative refractive power. Thereby, it is possible to provide a wide-angle lens having a half angle of view greater than 25 degrees and having the compact configuration of six lenses and an aperture diaphragm. Moreover, as seen from the lens data (Tables 1 to 3) and the aberration diagrams (FIGS. 3 and 4), the image reading lens system 31 is configured so that the fourth lens L4 and the sixth lens L6 are made of resin, and the surfaces of the lens made of resin are formed of the aspheric surfaces. Thus, it is possible to suppress various aberrations with an excellent balance even in the wide angle range where a half angle of view ω is greater than 25 degrees.

Furthermore, the image reading lens system 31 is configured so that the first lens L1 and the sixth lens L6 are formed of the negative lenses. Thus, it is possible to achieve compactness while satisfactorily correcting the field curvature.

In addition, the image reading lens system 31 is configured so that the sixth lens L6 is formed of the negative aspheric lens made of resin. Thus, as compared with the case where another lens in the system is formed of a negative aspheric lens made of resin, it is possible to more satisfactorily correct the field curvature. Moreover, the image reading lens system 31 is configured so that a refractive power of the sixth lens L6 becomes larger as compared with a different image reading lens system (for example, the image reading lens system 51 in Example 5 to be described later) having the fourth lens L4 formed of a positive aspheric lens made of resin and the sixth lens L6 formed of a negative aspheric lens made of resin. Thereby, it is possible to satisfactorily correct especially the field curvature.

Further, the image reading lens system 31 is configured so that fourth lens L4 is formed as the positive aspheric lens made of resin. Thus, as compared with the case where another lens in the system is formed of a positive aspheric lens made of resin, it is possible to more satisfactorily correct the field curvature.

The image reading lens system 31 is configured so that a cemented lens 32 is formed by cementing the second lens L2 and the third lens L3, and is disposed adjacent to the aperture diaphragm S6. Thus, it is possible to satisfactorily correct the longitudinal chromatic aberration. In addition, the image reading lens system 31 is configured so that two positive lenses, that is, the fourth lens L4 and the fifth lens L5, are disposed on the image side of the aperture diaphragm S6. Thus, it is possible to further satisfactorily correct the spherical aberration.

In addition, the image reading lens system 31 is configured so that the fourth lens L4 is formed as the positive aspheric lens made of resin, and the sixth lens L6 is formed of the negative aspheric lens made of resin. Thus, even when a temperature of the whole image reading lens system 31 is changed due to continuous use of the image reading apparatus, focus movement due to temperature variation of the fourth lens L4 and focus movement due to temperature variation of the sixth lens L6 substantially cancel each other out. As a result, focus movement scarcely occurs in terms of the whole image reading lens system 31.

As can be seen from Table 3, the image reading lens system 31 is configured to satisfy the above-mentioned conditional expressions (1) to (5). Therefore, it is possible to suppress various aberrations with an excellent balance even in the wide angle range where a half angle of view ω is greater than 25 degrees.

EXAMPLE 2

Figure 5:
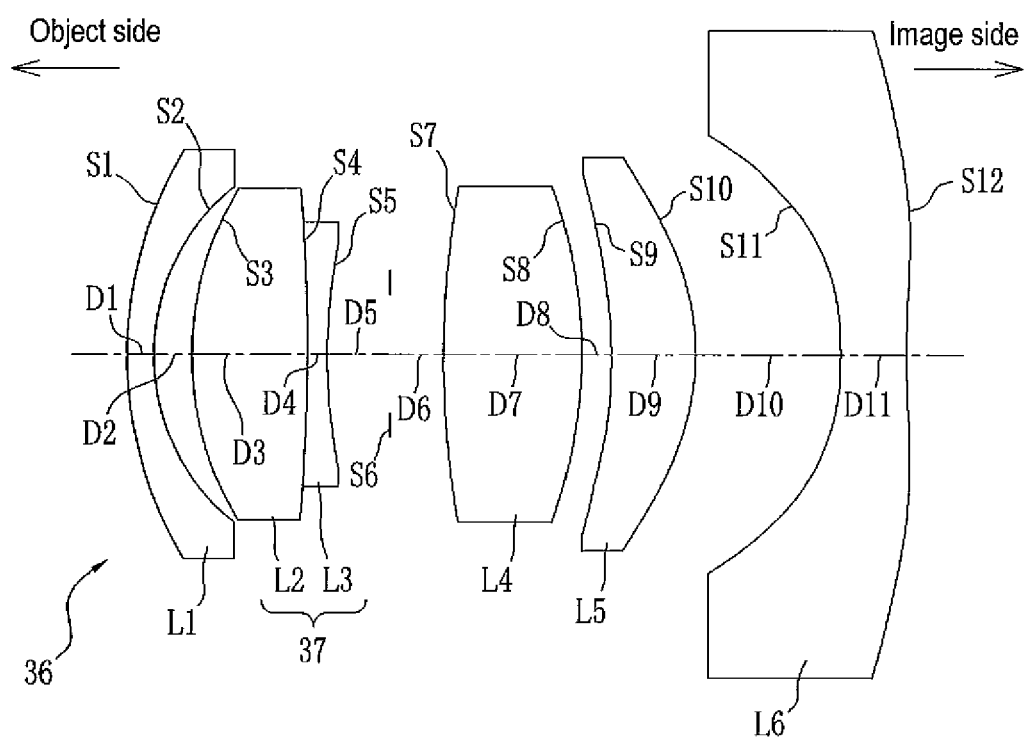
FIG. 5 is a section view illustrating an image reading lens system according to Example 2.

As shown in FIG. 5, an image reading lens system 36 according to Example 2 includes six lenses having first to sixth lenses L1 to L6 that are arranged in order from the object side and an aperture diaphragm S6. The aperture diaphragm S6 is disposed between the third lens L3 and the fourth lens L4. Specifically, in the image reading lens system 36, there are arranged, in order from the object side, a front group (the first lens L1, the second lens L2, and the third lens L3), the aperture diaphragm S6, and a rear group (the fourth lens L4, the fifth lens L5, and the sixth lens L6). In addition, the second lens L2 and the third lens L3 form a cemented lens 37.

In the image reading lens system 36, the first lens L1, the third lens L3, and the sixth lens L6 are formed of negative lenses, and the second lens L2, the fourth lens L4, and the fifth lens L5 are formed of positive lenses.

TABLE 4

| Si (Surface number) | Ri (Radius of curvature) | Di (Surface spacing) | Ndj (Refractive index) | νdj (Abbe number) |
|---|---|---|---|---|
| 1 | 21.48 | 1.46 | 1.75520 | 27.5 |
| 2 | 11.61 | 2.08 | | |
| 3 | 17.34 | 6.27 | 1.83481 | 42.7 |
| 4 | −121.71 | 1.09 | 1.66680 | 33.1 |
| 5 | 31.30 | 3.44 | | |
| 6 | (AD*) | 2.85 | | |
| 7 | 50.69 | 7.49 | 1.61800 | 63.3 |

TABLE 4-continued

| 8 | −26.64 | 1.60 | | |
| 9* | −27.78 | 4.58 | 1.53112 | 55.4 |
| 10* | −13.76 | 7.89 | | |
| 11* | −20.00 | 3.55 | 1.58364 | 30.2 |
| 12* | 38.89 | | | |

| | |
| --- | --- |
| Focal length of the whole system f (mm) | 31.0 |
| F number | 4.5 |
| Imaging magnification β | −0.220 |
| Angle of view 2ω (degrees) | 79.8 |
| *AD: Aperture diaphragm | |

As shown in Table 4, each lens in the image reading lens system 36 has different material. The first lens L1, the second lens L2, the third lens L3, and the fourth lens L4 are made of glass, and surfaces of all these lenses are formed of spherical surfaces. On the other hand, in the image reading lens system 36, the fifth lens L5 and the sixth lens L6 are made of resin, and the surfaces S9 and S10 of the fifth lens L5 and the surfaces S11 and S12 of the sixth lens L6 are formed of aspheric surfaces.

TABLE 5

| Aspheric coefficient | 9th surface (S9) | 10th surface (S10) | 11th surface (S11) | 12th surface (S12) |
| --- | --- | --- | --- | --- |
| KA | −1.000E+00 | −1.000E+00 | 9.978E−01 | −1.000E+00 |
| $B_3$ | −1.153E−04 | −2.636E−04 | −1.365E−03 | −1.298E−03 |
| $B_4$ | 1.933E−05 | 2.886E−06 | −1.080E−04 | −5.434E−05 |
| $B_5$ | −7.928E−06 | −2.470E−06 | 1.966E−05 | 3.257E−06 |
| $B_6$ | 4.234E−07 | −6.847E−07 | −2.589E−06 | 1.566E−07 |
| $B_7$ | 6.590E−08 | 3.602E−09 | 1.949E−09 | −1.558E−09 |
| $B_8$ | 4.748E−09 | 8.835E−09 | 1.202E−08 | −3.149E−10 |
| $B_9$ | −5.739E−10 | 1.134E−09 | 6.484E−10 | −9.408E−12 |
| $B_{10}$ | −1.235E−11 | −1.151E−10 | −7.410E−11 | 6.107E−13 |

Similarly to the image reading lens system 31 according to Example 1, specific shapes of the aspheric surfaces S9 to S12 of the fifth lens L5 and sixth lens L6 are represented by the numerical expression 1 mentioned above. Specific aspheric coefficients of the surfaces S9 to S12 of the image reading lens system 36 are shown in Table 5.

TABLE 6

| | |
| --- | --- |
| (1) f1/f | −1.14 |
| (2) f5/f | 1.480 |
| (3) R3/f | 0.56 |
| (4) D8/f | 0.24 |
| (5) D11/f | 0.25 |

As shown in Table 6, the image reading lens system 36 has the following specifications: f1/f=−1.14, f5/f=1.480, R3/f=0.56, D8/f=0.24, and D11/f=0.25. That is, the image reading lens system satisfies the above-mentioned conditional expressions (1) to (5).

Figure 6:
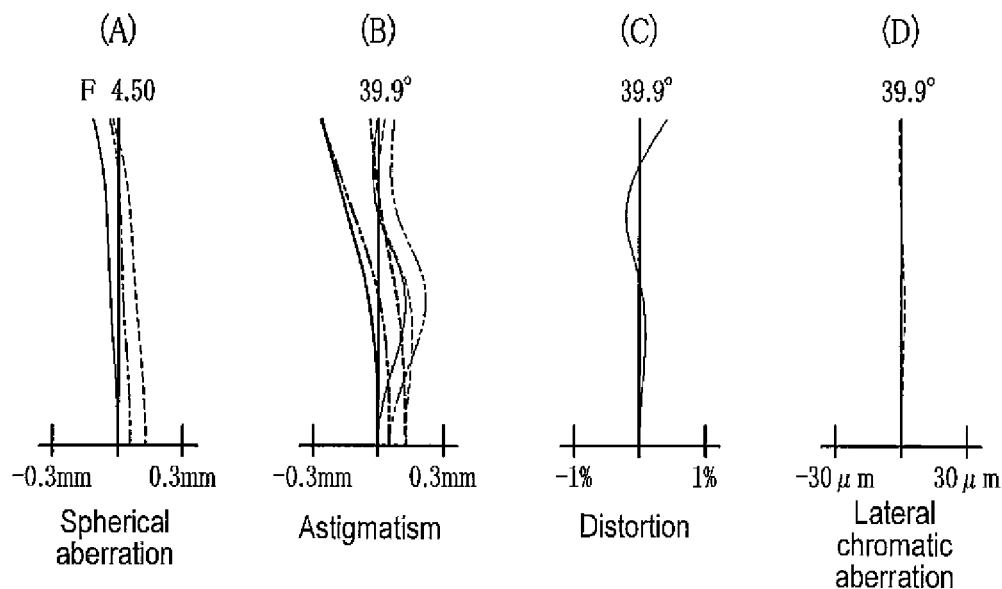
FIG. 6 is an aberration diagram illustrating the spherical aberration, astigmatism, distortion, and lateral chromatic aberration of the image reading lens system according to Example 2.
Figure 7:
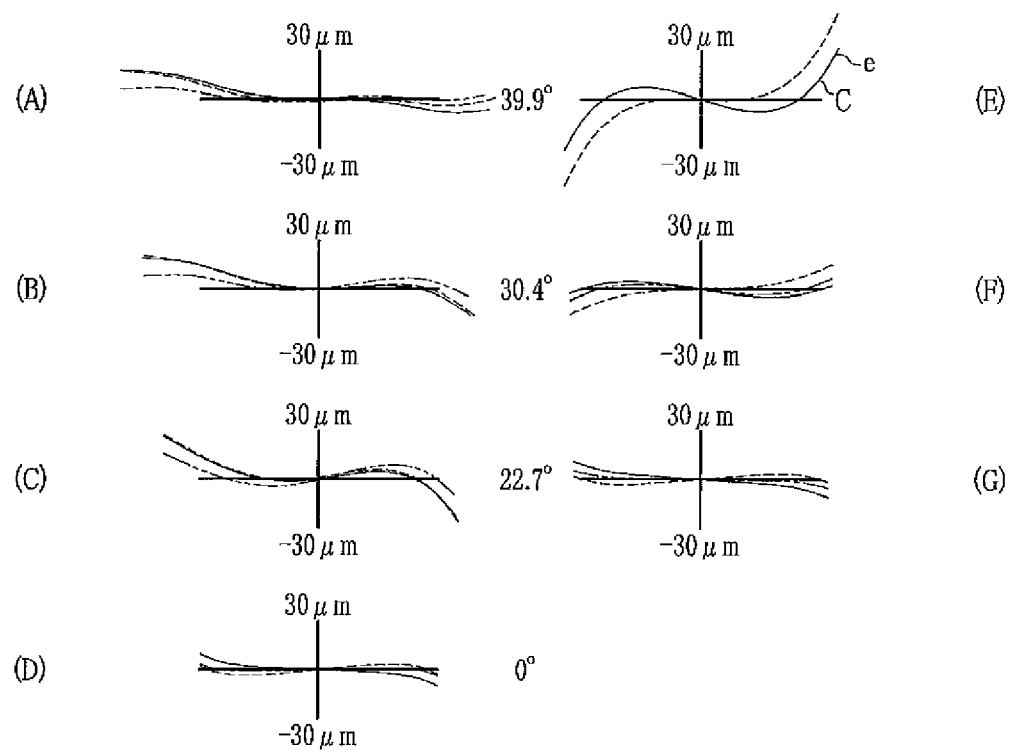
FIG. 7 is an aberration diagram illustrating the comatic aberration of the image reading lens system according to Example 2.

FIG. 6 shows the spherical aberration, the astigmatism, distortion, and the lateral chromatic aberration of the image reading lens system 36. In addition, FIGS. 7(A) to 7(D) show the tangential coma aberrations (aberration in T direction) at a half angle of view ω (degrees)=39.9, 30.4, 22.7, and 0, respectively. Likewise, FIGS. 7(E) to 7(G) show the sagittal coma aberrations (aberration in S direction) at a half angle of view ω (degrees)=39.9, 30.4, and 22.7, respectively. Furthermore, notation of these various aberration diagrams of the image reading lens system 36 is also similar to Example 1.

The image reading lens system 36 is configured so that the fifth lens L5 and the sixth lens L6 are formed of the aspheric lenses, and the first lens L1 has the negative refractive power. Thereby, it is possible to provide a wide-angle lens having a half angle of view greater than 25 degrees and having the compact configuration of six lenses and an aperture diaphragm. Moreover, as seen from the lens data (Tables 4 to 6) and the aberration diagrams (FIGS. 6 and 7), the image reading lens system 36 is configured so that the fifth lens L5 and the sixth lens L6 are made of resin, and the surfaces of these lenses made of resin are formed of the aspheric surfaces. Thus, it is possible to suppress various aberrations with an excellent balance even in the wide angle range where a half angle of view ω is greater than 25 degrees.

Furthermore, the image reading lens system 36 is configured so that the first lens L1 and the sixth lens L6 are formed of the negative lenses. Thus, it is possible to achieve compactness while satisfactorily correcting the field curvature.

In addition, the image reading lens system 36 is configured so that the sixth lens L6 is formed of the negative aspheric lens made of resin. Thus, as compared with the case where another lens in the system is formed of a negative aspheric lens made of resin, it is possible to more satisfactorily correct the field curvature. Moreover, as can be seen from Table 6 and the like, the image reading lens system 36 is configured so that the image-side surface S12 of the sixth lens L6 is formed into a concave shape directed to the image side in the periphery thereof. Thereby, it is possible to more satisfactorily the correct field curvature, as compared with a different image reading lens system (for example, the image reading lens system 56 in Example 6 to be described later) having the fifth lens L5 formed of a positive aspheric lens made of resin and the sixth lens L6 formed of a negative aspheric lens made of resin.

Further, the image reading lens system 36 is configured so that fifth lens L5 is formed of the positive aspheric lens made of resin. Thus, as compared with the case where another lens in the system is formed of a positive aspheric lens made of resin, it is possible to more satisfactorily correct the spherical aberration.

The image reading lens system 36 is configured so that a cemented lens 37 is formed by cementing the second lens L2 and the third lens L3, and is disposed adjacent to the aperture diaphragm S6. Thus, it is possible to satisfactorily correct the longitudinal chromatic aberration. In addition, the image reading lens system 36 is configured so that two positive lenses, that is, The fourth lens L4 and the fifth lens L5, are disposed on the image side of the aperture diaphragm S6. Thus, it is possible to further satisfactorily correct the spherical aberration.

The image reading lens system 36 is configured so that the fifth lens L5 is formed of the positive aspheric lens made of resin, and the sixth lens L6 is formed of the negative aspheric lens made of resin. Thus, even when a temperature of the whole image reading lens system 36 is changed due to continuous use of the image reading apparatus, focus movement due to temperature variation of the fifth lens L5 and focus movement due to temperature variation of the sixth lens L6 substantially cancel each other out. As a result, focus movement scarcely occurs in terms of the whole image reading lens system 36.

As can be seen from Table 6, the image reading lens system 36 satisfies the above-mentioned conditional expressions (1) to (5). Therefore, it is possible to suppress various aberrations with an excellent balance even in the wide angle range where a half angle of view ω is greater than 25 degrees.

EXAMPLE 3

Figure 8:
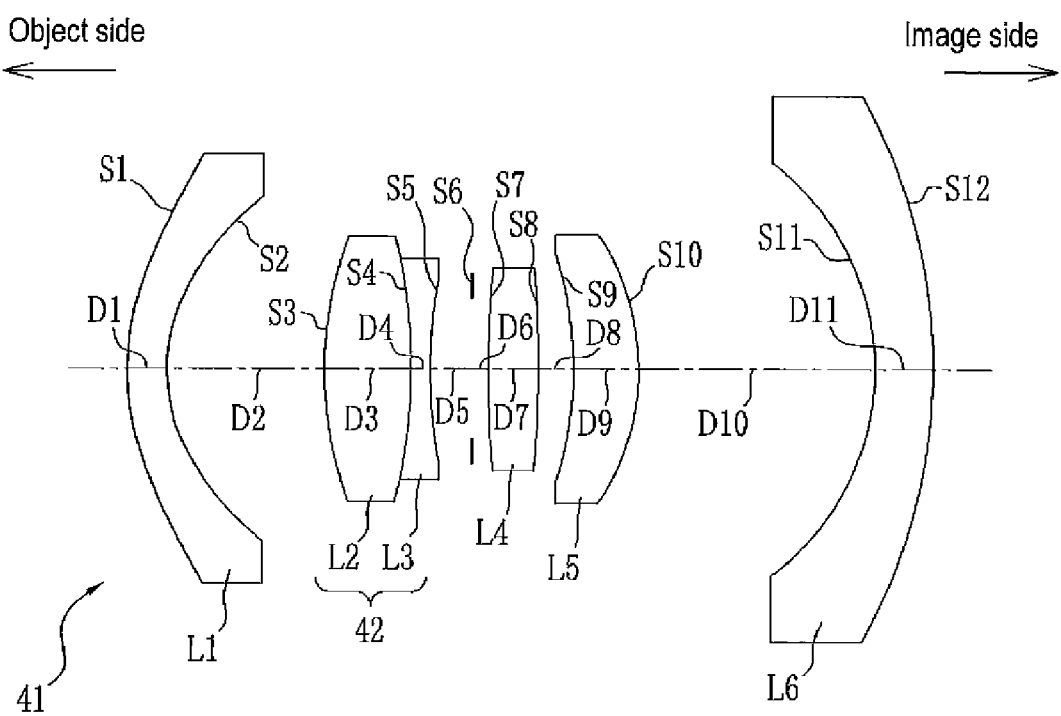
FIG. 8 is a section view illustrating an image reading lens system according to Example 3.

As shown in FIG. 8, an image reading lens system 41 according to Example 3 includes six lenses having first to sixth lenses L1 to L6 that are arranged in order from the object side and an aperture diaphragm S6. The aperture diaphragm S6 is disposed between the third lens L3 and the fourth lens L4. Specifically, in the image reading lens system 41, there are arranged, in order from the object side, a front group (the first lens L1, the second lens L2, and the third lens L3), the aperture diaphragm S6, and a rear group (the fourth lens L4, the fifth lens L5, and the sixth lens L6). In addition, the second lens L2 and the third lens L3 form a cemented lens 42.

In the image reading lens system 41, the first lens L1, the third lens L3, and the sixth lens L6 are formed of negative lenses, and the second lens L2, the fourth lens L4, and the fifth lens L5 are formed of positive lenses.

TABLE 7

| Si (Surface number) | Ri (Radius of curvature) | Di (Surface spacing) | Ndj (Refractive index) | vdj (Abbe number) |
|---|---|---|---|---|
| 1* | 12.74 | 2.07 | 1.58364 | 30.2 |
| 2* | 8.59 | 8.23 | | |
| 3 | 19.62 | 4.55 | 1.75500 | 52.3 |
| 4 | −29.11 | 0.96 | 1.66680 | 33.1 |
| 5 | 24.91 | 2.17 | | |
| 6 | (AD*) | 0.82 | | |
| 7 | 51.37 | 2.65 | 1.83400 | 37.2 |
| 8 | −64.73 | 1.78 | | |
| 9* | −22.02 | 3.42 | 1.53112 | 55.4 |
| 10* | −12.82 | 12.32 | | |
| 11 | −13.36 | 3.00 | 1.80518 | 25.4 |
| 12 | −29.59 | | | |

| | |
|---|---|
| Focal length of the whole system f (mm) | 31.9 |
| F number | 4.5 |
| Imaging magnification β | −0.220 |
| Angle of view 2ω (degrees) | 79.6 |

*AD: Aperture diaphragm

As shown in Table 7, each lens in the image reading lens system 41 has different material. The second lens L2, the third lens L3, the fourth lens L4, and the sixth lens L6 are made of glass, and surfaces of all these lenses are formed as spherical surfaces. On the other hand, in the image reading lens system 41, the first lens L1 and the fifth lens L5 are made of resin, and the surfaces S1 and S2 of the first lens L1 and the surfaces S9 and S10 of the fifth lens L5 are formed of aspheric surfaces.

TABLE 8

| Aspheric coefficient | 1st surface (S1) | 2nd surface (S2) | 9th surface (S9) | 10th surface (S10) |
|---|---|---|---|---|
| KA | −4.742E−01 | 1.552E−01 | 7.493E−01 | 9.914E−01 |
| $B_3$ | 3.724E−05 | 8.508E−05 | 6.499E−05 | 4.906E−05 |
| $B_4$ | −2.226E−05 | −1.993E−05 | −8.047E−05 | −2.943E−05 |
| $B_5$ | −3.336E−06 | −2.973E−07 | 4.324E−06 | 1.320E−05 |
| $B_6$ | 1.408E−07 | 2.721E−07 | −7.424E−07 | −1.455E−06 |
| $B_7$ | 1.505E−08 | −6.425E−09 | −9.456E−10 | −1.642E−07 |
| $B_8$ | −5.872E−10 | 2.184E−09 | 2.830E−08 | 2.180E−08 |
| $B_9$ | −1.265E−10 | 4.589E−10 | 1.162E−09 | 5.445E−09 |
| $B_{10}$ | 5.953E−12 | −3.891E−11 | −6.860E−10 | −6.412E−10 |

Similarly to the image reading lens system 31 according to Example 1, specific shapes of the aspheric surfaces S1, S2, S9, and S10 of the first lens L1 and fifth lens L5 are represented by the numerical expression 1 mentioned above. Specific aspheric coefficients of the surfaces S1, S2, S9, and S10 of the image reading lens system 41 are shown in Table 8.

TABLE 9

| | |
|---|---|
| (1) f1/f | −1.72 |
| (2) f5/f | 1.598 |
| (3) R3/f | 0.62 |
| (4) D8/f | 0.08 |
| (5) D11/f | 0.39 |

As shown in Table 9, the image reading lens system 41 has the following specifications: f1/f=−1.72, f5/f=1.598, R3/f=0.62, D8/f=0.08, and D11/f=0.39. That is, the image reading lens system is configured to satisfy the above-mentioned conditional expressions (1) to (5).

Figure 9:
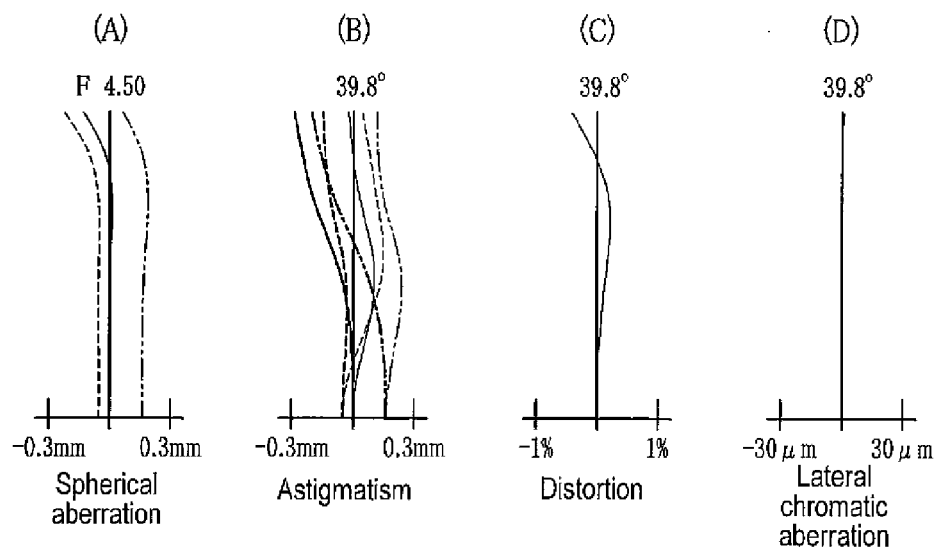
FIG. 9 is an aberration diagram illustrating the spherical aberration, astigmatism, distortion, and lateral chromatic aberration of the image reading lens system according to Example 3.
Figure 10:
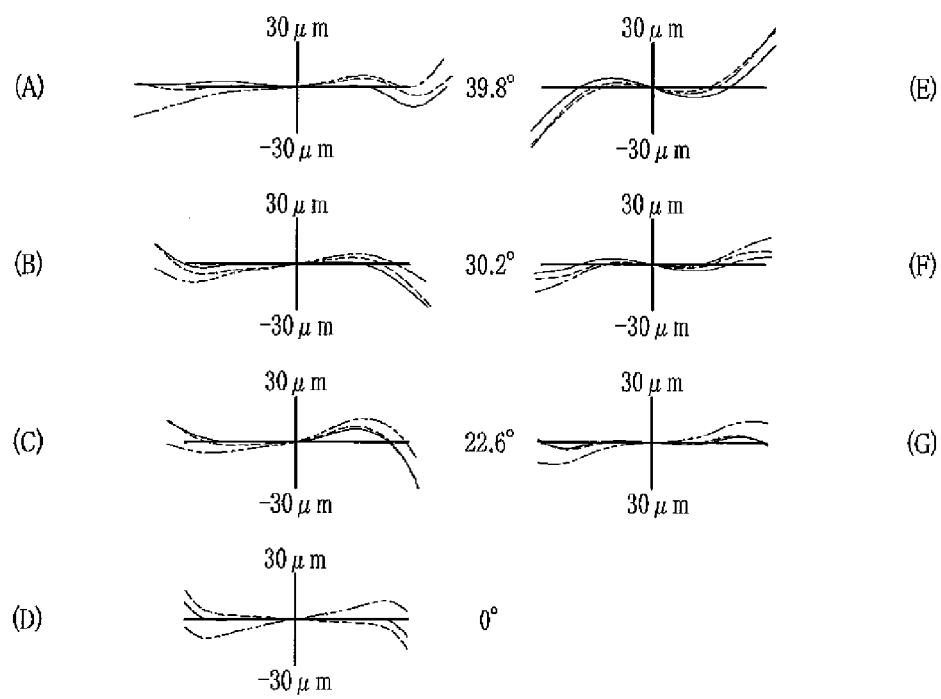
FIG. 10 is an aberration diagram illustrating the comatic aberration of the image reading lens system according to Example 3.

FIG. 9 shows the spherical aberration, the astigmatism, the distortion, and the lateral chromatic aberration of the image reading lens system 41. In addition, FIGS. 10(A) to 10(D) show the tangential coma aberrations (aberration in T direction) at a half angle of view ω (degrees)=39.8, 30.2, 22.6, and 0, respectively. Likewise, FIGS. 10(E) to 10(G) show the sagittal coma aberrations (aberration in S direction) at a half angle of view ω (degrees)=39.8, 30.2, and 22.6, respectively. Furthermore, notation of these various aberration diagrams of the image reading lens system 41 is also similar to Example 1.

The image reading lens system 41 is configured so that the first lens L1 and the fifth lens L5 are formed of the aspheric lenses, and the first lens L1 has the negative refractive power. Thereby, it is possible to provide a wide-angle lens having a half angle of view greater than 25 degrees and having the compact configuration of the six lenses and the aperture diaphragm. Moreover, as seen from the lens data (Tables 7 to 9) and aberration diagrams (FIGS. 9 and 10), the image reading lens system 41 is configured so that the first lens L1 and the fifth lens L5 are made of resin, and the surfaces of these lenses made of resin are formed of the aspheric surfaces. Thus, it is possible to suppress various aberrations with an excellent balance even in the wide angle range where a half angle of view ω is greater than 25 degrees.

Furthermore, the image reading lens system 41 is configured so that the first lens L1 and the sixth lens L6 are formed of the negative lenses. Thus, it is possible to achieve compactness while satisfactorily correcting the field curvature. Moreover, the image reading lens system 41 is configured so that a spacing between the first lens L1 and the second lens L2 becomes large. Thereby, it is possible to more satisfactorily correct the field curvature, as compared with a different image reading lens system (for example, the image reading lens system 61 in Example 7 to be described later) having the first lens L1 formed of a negative aspheric lens made of resin and the fifth lens L5 formed of a positive aspheric lens made of resin.

In addition, the image reading lens system 41 is configured so that first lens L1 is formed of the negative aspheric lens made of resin. Thus, it is possible to allow a size of the first lens L1 to be smaller than that of the sixth lens L6 when the sixth lens L6 is formed of a negative aspheric lens made of resin. As a result, it becomes easy to suppress manufacturing error in molding.

Further, the image reading lens system 41 is configured so that fifth lens L5 is formed of the positive aspheric lens made of resin. Thus, as compared with the case where another lens in the system is formed as a positive aspheric lens made of resin, it is possible to more satisfactorily correct the spherical aberration.

The image reading lens system 41 is configured so that a cemented lens 42 is formed by cementing the second lens L2 and the third lens L3, and is disposed adjacent to the aperture diaphragm S6. Thus, it is possible to satisfactorily correct the longitudinal chromatic aberration. In addition, the image reading lens system 41 is configured so that two positive lenses, that is, the fourth lens L4 and the fifth lens L5 are disposed on the image side of the aperture diaphragm S6. Thus, it is possible to further satisfactorily correct the spherical aberration.

Furthermore, the image reading lens system 41 is configured so that the first lens L1 is formed of the positive aspheric lens made of resin, and the fifth lens L5 is formed of the negative aspheric lens made of resin. Thus, even if a temperature of the whole image reading lens system 41 is changed due to continuous use of the image reading apparatus, focus movement due to temperature variation of the first lens L1 and focus movement due to temperature variation of the fifth lens L5 substantially cancel each other out. As a result, focus movement scarcely occurs in terms of the whole image reading lens system 41.

As can be seen from Table 9, the image reading lens system 41 satisfies the above-mentioned conditional expressions (1) to (5). Therefore, it is possible to suppress various aberrations with an excellent balance even in the wide angle range where a half angle of view ω is greater than 25 degrees.

EXAMPLE 4

Figure 11:
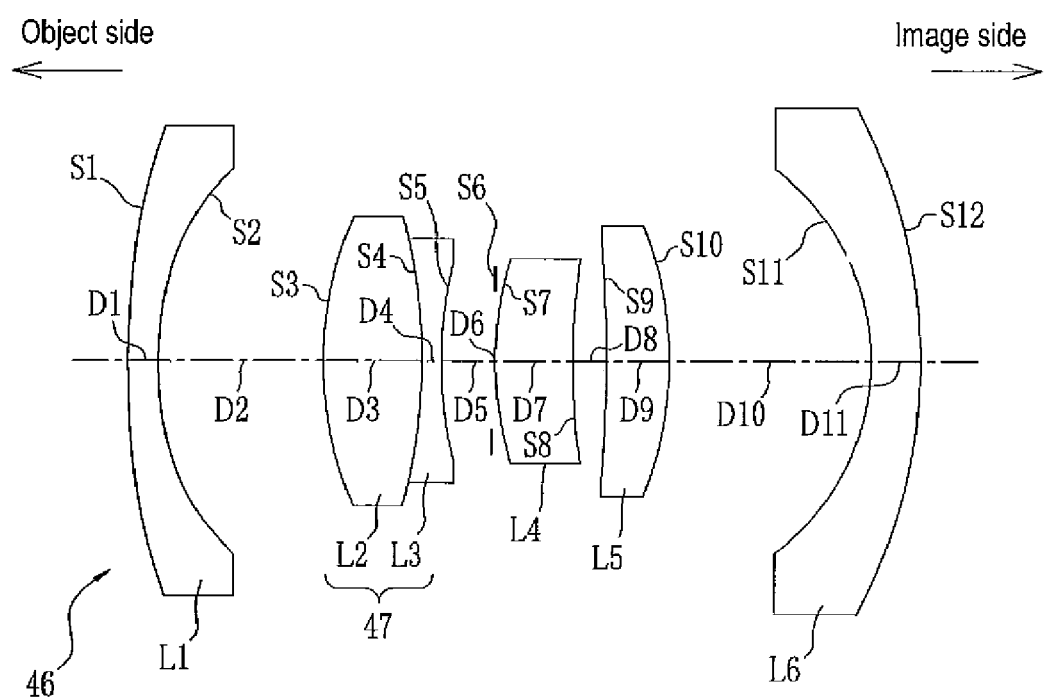
FIG. 11 is a section view illustrating an image reading lens system according to Example 4.

As shown in FIG. 11, an image reading lens system 46 according to Example 4 includes six lenses having first to sixth lenses L1 to L6 that are arranged in order from the object side and an aperture diaphragm S6. The aperture diaphragm S6 is disposed between the third lens L3 and the fourth lens L4. Specifically, in the image reading lens system 46, there are arranged, in order from the object side, a front group (the first lens L1, the second lens L2, and the third lens L3), the aperture diaphragm S6, and a rear group (the fourth lens L4, the fifth lens L5, and the sixth lens L6). In addition, the second lens L2 and the third lens L3 form a cemented lens 47.

In the image reading lens system 46, the first lens L1, the third lens L3, and the sixth lens L6 are formed of negative lenses, and the second lens L2, the fourth lens L4, and the fifth lens L5 are formed of positive lenses.

TABLE 10

| Si (Surface number) | Ri (Radius of curvature) | Di (Surface spacing) | Ndj (Refractive index) | νdj (Abbe number) |
|---|---|---|---|---|
| 1* | 80.78 | 1.61 | 1.58364 | 30.2 |
| 2* | 21.52 | 8.78 | | |
| 3 | 19.14 | 5.26 | 1.83481 | 42.7 |
| 4 | −29.49 | 1.03 | 1.66680 | 33.1 |
| 5 | 21.08 | 2.90 | | |
| 6 | (AD*) | 0.00 | | |
| 7* | 18.97 | 4.13 | 1.53112 | 55.4 |
| 8* | 41.99 | 1.79 | | |
| 9 | −76.71 | 3.39 | 1.71300 | 53.9 |
| 10 | −19.23 | 10.73 | | |
| 11 | −12.78 | 2.65 | 1.76182 | 26.5 |
| 12 | −28.44 | | | |

| | |
|---|---|
| Focal length of the whole system f (mm) | 31.7 |
| F number | 4.5 |
| Imaging magnification β | −0.220 |
| Angle of view 2ω (degrees) | 80.2 |

*AD: Aperture diaphragm

As shown in Table 10, each lens in the image reading lens system 46 has different material. The second lens L2, the third lens L3, the fifth lens L5, and the sixth lens L6 are made of glass, and surfaces of all these lenses are formed of spherical surfaces. On the other hand, in the image reading lens system 46, the first lens L1 and the fourth lens L4 are made of resin, and the surfaces S1 and S2 of the first lens L1 and the surfaces S7 and S8 of the fourth lens L4 are formed of aspheric surfaces.

TABLE 11

| Aspheric coefficient | 1st surface (S1) | 2nd surface (S2) | 7th surface (S7) | 8th surface (S8) |
|---|---|---|---|---|
| KA | 1.000E+00 | 9.832E−01 | −8.864E−01 | 9.998E−01 |
| $B_3$ | 3.012E−04 | 3.112E−04 | 7.287E−05 | −5.071E−05 |
| $B_4$ | 5.423E−5 | 1.064E−04 | −4.863E−05 | 1.267E−04 |
| $B_5$ | −1.456E−06 | −3.114E−06 | 5.291E−05 | −2.030E−05 |
| $B_6$ | −2.218E−07 | 8.315E−08 | −1.622E−05 | 2.210E−06 |
| $B_7$ | −5.272E−09 | 1.358E−08 | 2.282E−06 | 3.387E−07 |
| $B_8$ | 6.993E−10 | −6.669E−10 | 2.368E−07 | −6.166E−08 |
| $B_9$ | 7.045E−11 | −1.687E−10 | −1.329E−07 | −7.181E−09 |
| $B_{10}$ | −4.134E−12 | 2.346E−11 | 1.316E−08 | 1.262E−09 |

Similarly to the image reading lens system 31 according to Example 1, specific shapes of the aspheric surfaces S1, S2, S7, and S8 of the first lens L1 and fourth lens L4 are represented by the numerical expression 1 mentioned above. Specific aspheric coefficients of the surfaces S1, S2, S7, and S8 of the image reading lens system 46 are shown in Table 11.

TABLE 12

| | |
|---|---|
| (1) f1/f | −1.59 |
| (2) f5/f | 1.105 |
| (3) R3/f | 0.60 |
| (4) D8/f | 0.13 |
| (5) D11/f | 0.34 |

As shown in Table 12, the image reading lens system 46 has the following specifications: f1/f=−1.59, f5/f=1.105, R3/f=0.60, D8/f=0.13, and D11/f=0.34. That is, the image reading lens system is configured to satisfy the above-mentioned conditional expressions (1) to (5).

Figure 12:
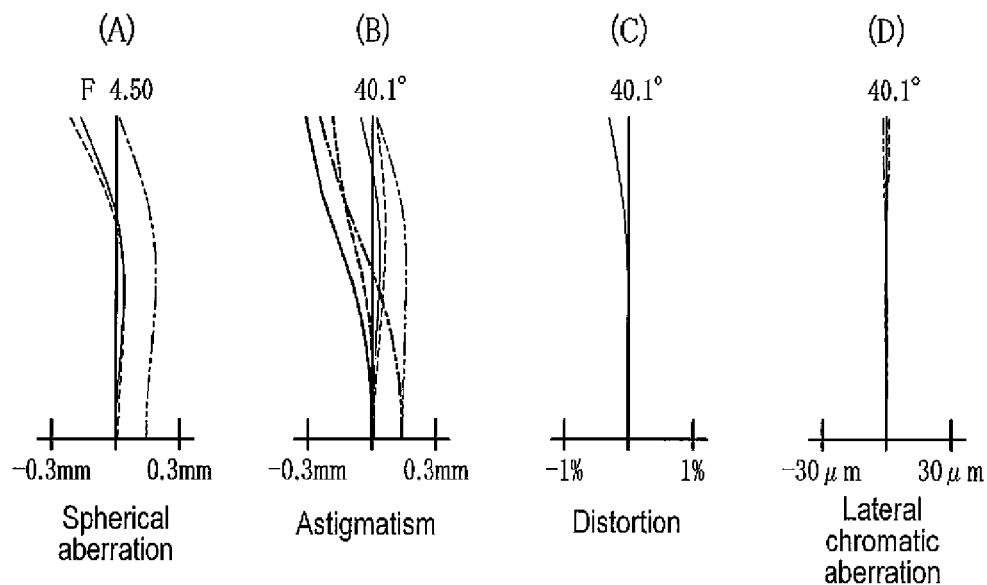
FIG. 12 is an aberration diagram illustrating the spherical aberration, astigmatism, distortion, and lateral chromatic aberration of the image reading lens system according to Example 4.
Figure 13:
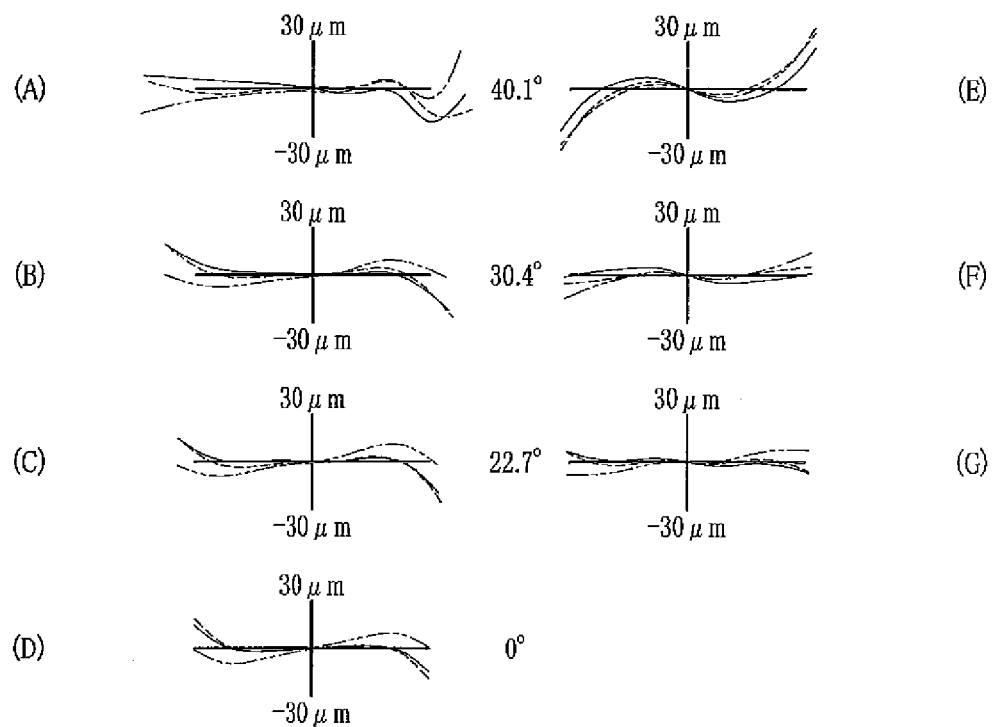
FIG. 13 is an aberration diagram illustrating the comatic aberration of the image reading lens system according to Example 4.

FIG. 12 shows the spherical aberration, the astigmatism, the distortion, and the lateral chromatic aberration of the image reading lens system 46. In addition, FIGS. 13(A) to 13(D) show the tangential coma aberrations (aberration in T direction) at a half angle of view ω (degrees)=40.1, 30.4, 22.7, and 0, respectively. Likewise, FIGS. 13(E) to 13(G) show sagittal coma aberrations (aberration in S direction) at a half angle of view ω (degrees)=−40.1, 30.4, and 22.7, respectively. Furthermore, notation of these various aberration diagrams of the image reading lens system 46 is also similar to Example 1.

The image reading lens system 46 is configured so that the first lens L1 and the fourth lens L4 are formed of the aspheric lenses, and the first lens L1 has the negative refractive power. Thereby, it is possible to provide a wide-angle lens having a half angle of view greater than 25 degrees and having the compact configuration of the six lenses and the aperture diaphragm. Moreover, as seen from the lens data (Tables 10 to 12) and aberration diagrams (FIGS. 12 and 13), the image reading lens system 46 is configured so that the first lens L1 and the fourth lens L4 are made of resin, and the surfaces of these lenses made of resin are formed of the aspheric surfaces. Thus, it is possible to suppress various aberrations with an excellent balance even in the wide angle range where a half angle of view ω is greater than 25 degrees.

Furthermore, the image reading lens system 46 is configured so that the first lens L1 and the sixth lens L6 are formed of the negative lenses. Thus, it is possible to achieve compactness while satisfactorily correcting the field curvature.

In addition, the image reading lens system 46 is configured so that first lens L1 is formed of the negative aspheric lens made of resin. Thus, it is possible to allow a size of the first lens L1 to be smaller than that of the sixth lens L6 when the sixth lens L6 is formed of a positive aspheric lens made of resin. As a result, it becomes easy to suppress manufacturing error in molding.

Further, the image reading lens system 46 is configured so that fourth lens L4 is formed of the positive aspheric lens made of resin. Thus, as compared with the case where another lens in the system is formed of a positive aspheric lens made of resin, it is possible to more satisfactorily correct the field curvature. Moreover, the image reading lens system 46 is configured so that a spacing between the first lens L1 and the second lens L2 becomes large. Thereby, it is possible to more satisfactorily correct the field curvature, as compared with a different image reading lens system (for example, the image reading lens system 66 in Example 8 to be described later) having the first lens L1 formed of a negative aspheric lens made of resin and the fourth lens L4 formed of a positive aspheric lens made of resin.

The image reading lens system 46 is configured so that a cemented lens 47 is formed by cementing the second lens L2 and the third lens L3, and is disposed adjacent to the aperture diaphragm S6. Thus, it is possible to satisfactorily correct the longitudinal chromatic aberration. In addition, the image reading lens system 46 is configured so that two positive lenses, that is, the fourth lens L4 and the fifth lens L5 are disposed on the image side of the aperture diaphragm S6. Thus, it is possible to further satisfactorily correct the spherical aberration.

In addition, the image reading lens system 46 is configured so that the first lens L1 is formed of the negative aspheric lens made of resin, and the fourth lens L4 is formed of the positive aspheric lens made of resin. Thus, when a temperature of the whole image reading lens system 46 is changed due to continuous use of the image reading apparatus, focus movement due to temperature variation of the first lens L1 and focus movement due to temperature variation of the fourth lens L4 substantially cancel each other out. As a result, focus movement scarcely occurs in terms of the whole image reading lens system 46.

As can be seen from Table 12, the image reading lens system 46 satisfies the above-mentioned conditional expressions (1) to (5). Therefore, it is possible to suppress various aberrations with an excellent balance even in the wide angle range where a half angle of view ω is greater than 25 degrees.

EXAMPLE 5

Figure 14:
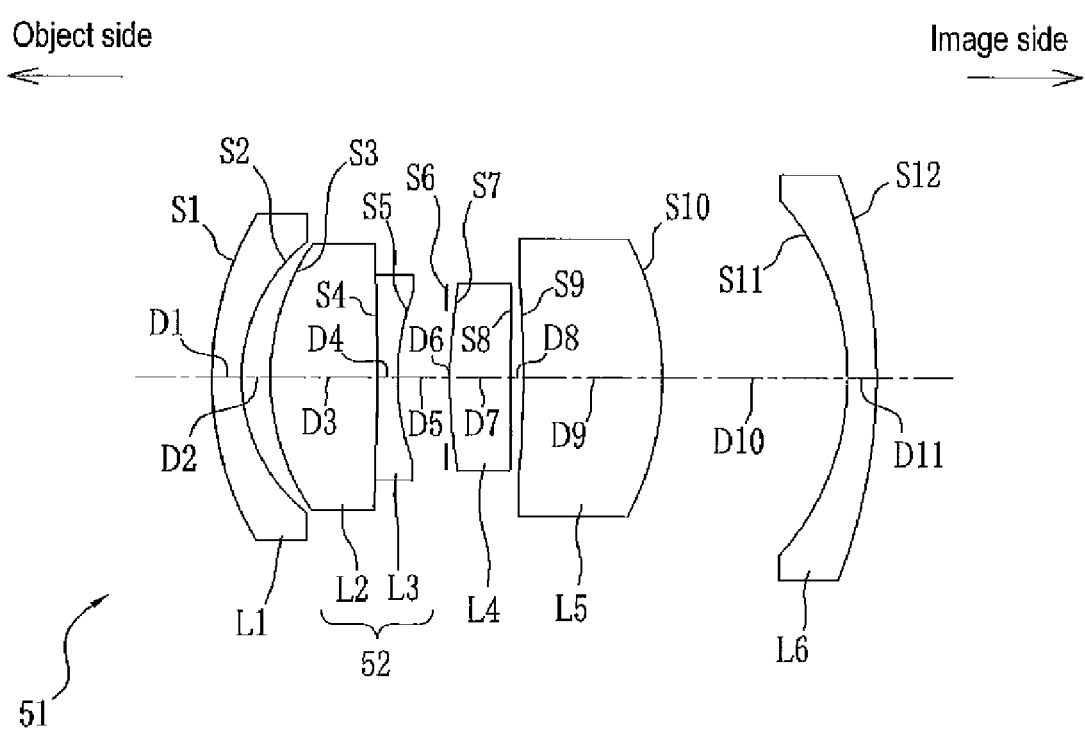
FIG. 14 is a section view illustrating an image reading lens system according to Example 5.

As shown in FIG. 14, an image reading lens system 51 according to Example 5 includes six lenses having first to sixth lenses L1 to L6 that are arranged in order from the object side and an aperture diaphragm S6. The aperture diaphragm S6 is disposed between the third lens L3 and the fourth lens L4. Specifically, in the image reading lens system 51, there are arranged, in order from the object side, a front group (the first lens L1, the second lens L2, and the third lens L3), the aperture diaphragm S6, and a rear group (the fourth lens L4, the fifth lens L5, and the sixth lens L6). In addition, the second lens L2 and the third lens L3 form a cemented lens 52.

In the image reading lens system 51, the first lens L1, the third lens L3, and the sixth lens L6 are formed of negative lenses, and the second lens L2, the fourth lens L4, and the fifth lens L5 are formed of positive lenses.

TABLE 13

| Si (Surface number) | Ri (Radius of curvature) | Di (Surface spacing) | Ndj (Refractive index) | νdj (Abbe number) |
|---|---|---|---|---|
| 1 | 12.96 | 1.19 | 1.51742 | 52.4 |
| 2 | 6.93 | 1.17 | | |
| 3 | 9.41 | 4.27 | 1.83481 | 42.7 |
| 4 | −223.15 | 0.81 | 1.74077 | 27.8 |
| 5 | 9.38 | 1.97 | | |
| 6 | (AD*) | 0.17 | | |
| 7* | 23.53 | 2.42 | 1.53112 | 55.4 |
| 8* | 292.93 | 0.50 | | |
| 9 | −48.48 | 5.60 | 1.75500 | 52.3 |
| 10 | −11.76 | 7.39 | | |
| 11* | −10.13 | 1.17 | 1.58364 | 30.2 |
| 12* | −19.29 | | | |

Focal length of the whole system f (mm) 27.2
F number 4.5
Imaging magnification β −0.111
Angle of view 2ω (degrees) 58.0
*AD: Aperture diaphragm As shown in Table 13, each lens in the image reading lens system 51 has different material. The first lens L1, the second lens L2, the third lens L3, and the fifth lens L5 are made of glass, and surfaces of all these lenses are formed of spherical surfaces. On the other hand, in the image reading lens system 51, the fourth lens L4 and the sixth lens L6 are made of resin, and the surfaces S7 and S8 of the fourth lens L4 and the surfaces S11 and S12 of the sixth lens L6 are formed of aspheric surfaces.

TABLE 14

| Aspheric coefficient | 7th surface (S7) | 8th surface (S8) | 11th surface (S11) | 12th surface (S12) |
|---|---|---|---|---|
| KA | −9.931E−01 | 9.999E−01 | 5.856E−01 | −1.000E+00 |
| $B_3$ | 1.078E−05 | −1.780E−04 | −3.342E−04 | −4.122E−04 |
| $B_4$ | −7.802E−05 | 6.476E−05 | −5.789E−05 | 4.020E−05 |
| $B_5$ | −7.721E−06 | −6.989E−05 | 2.968E−05 | 7.337E−06 |
| $B_6$ | −9.163E−06 | 1.777E−06 | −6.139E−07 | 5.592E−07 |
| $B_7$ | 4.415E−06 | 2.469E−06 | −1.517E−07 | −5.062E−08 |
| $B_8$ | 1.358E−06 | 7.882E−08 | −4.322E−09 | −1.020E−08 |
| $B_9$ | −1.602E−07 | −8.793E−08 | −7.680E−10 | −4.548E−10 |
| $B_{10}$ | −1.072E−07 | 1.215E−09 | 8.917E−11 | 1.085E−10 |

Similarly to the image reading lens system 31 according to Example 1, specific shapes of the aspheric surfaces S7, S8, S11, and S12 of the fourth lens L4 and the sixth lens L6 are represented by the numerical expression 1 mentioned above. Specific aspheric coefficients of the surfaces S7, S8, S11, and S12 of the image reading lens system 51 are shown in Table 14.

TABLE 15

| (1) f1/f | −1.13 |
|---|---|
| (2) f5/f | 0.706 |
| (3) R3/f | 0.35 |
| (4) D8/f | 0.09 |
| (5) D11/f | 0.27 |

As shown in Table 15, the image reading lens system 51 has the following specification: f1/f=−1.13, f5/f=0.706, R3/f=0.35, D8/f=0.09, and D11/f=0.27. That is, the image reading lens system is configured to satisfy the above-mentioned conditional expressions (1) to (5).

Figure 15:
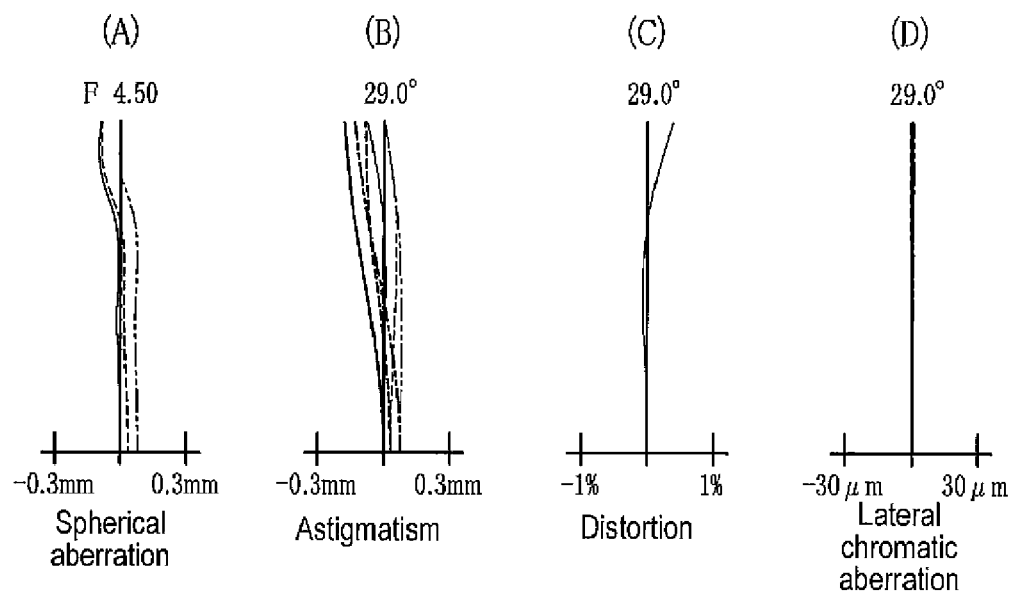
FIG. 15 is an aberration diagram illustrating the spherical aberration, astigmatism, distortion, and lateral chromatic aberration of the image reading lens system according to Example 5.
Figure 16:
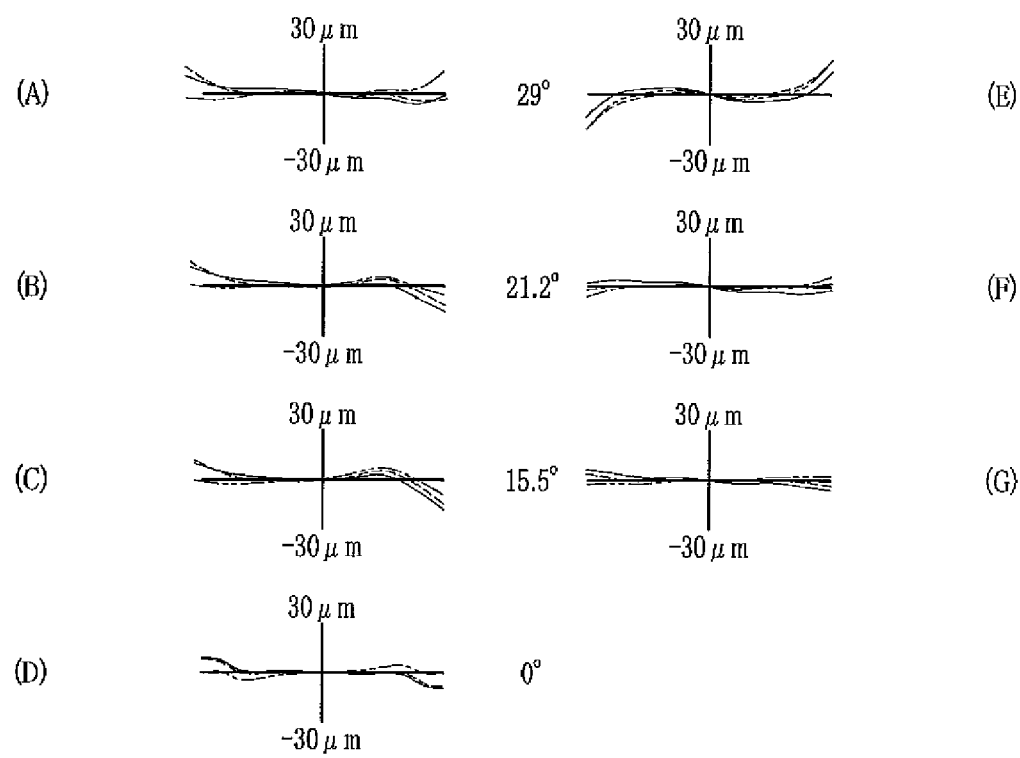
FIG. 16 is an aberration diagram illustrating the comatic aberration of the image reading lens system according to Example 5.

FIG. 15 shows the spherical aberration, the astigmatism, the distortion, and the lateral chromatic aberration of the image reading lens system 51. In addition, FIGS. 16(A) to 16(D) show the tangential coma aberrations (aberration in T direction) at a half angle of view ω (degrees)=29, 21.2, 15.5, and 0, respectively. Likewise, FIGS. 16(E) to 16(G) show the sagittal coma aberrations (aberration in S direction) at a half angle of view ω (degrees)=29, 21.2, and 15.5, respectively. Furthermore, notation of these various aberration diagrams of the image reading lens system 51 is also similar to Example 1.

The image reading lens system 51 is configured so that the fourth lens L4 and the sixth lens L6 are formed of the aspheric lenses, and the first lens L1 has the negative refractive power. Thereby, it is possible to provide a wide-angle lens having a half angle of view greater than 25 degrees and having the compact configuration of the six lenses and the aperture diaphragm. Moreover, as seen from the lens data (Tables 13 to 15) and aberration diagrams (FIGS. 15 and 16), the image reading lens system 51 is configured so that the fourth lens L4 and the sixth lens L6 are made of resin, and the surfaces of these lenses made of resin are formed of the aspheric surfaces. Thus, it is possible to suppress various aberrations with an excellent balance even in the wide angle range where a half angle of view ω is greater than 25 degrees.

Furthermore, the image reading lens system 51 is configured so that the first lens L1 and the sixth lens L6 are formed of the negative lenses. Thus, it is possible to achieve compactness while satisfactorily correcting the field curvature.

Further, the image reading lens system 51 is configured so that fourth lens L4 is formed of the positive aspheric lens made of resin. Thus, as compared with the case where another lens in the system is formed of a positive aspheric lens made of resin, it is possible to more satisfactorily correct the field curvature. Moreover, the image reading lens system 51 is configured so that a refractive power of the fourth lens L4 becomes large. Thereby, it is possible to more satisfactorily correct the spherical aberration, as compared with a different image reading lens system (for example, the image reading lens system 31 in Example 1 mentioned above) having the fourth lens L4 formed of a positive aspheric lens made of resin, and the sixth lens L6 formed of a negative aspheric lens made of resin.

Further, the image reading lens system 51 is configured so that sixth lens L6 is formed of the negative aspheric lens made of resin. Thus, as compared with the case where another lens in the system is formed of a negative aspheric lens made of resin, it is possible to more satisfactorily correct the field curvature.

The image reading lens system 51 is configured so that a cemented lens 52 is formed by cementing the second lens L2 and the third lens L3, and is disposed adjacent to the aperture diaphragm S6. Thus, it is possible to satisfactorily correct the longitudinal chromatic aberration. In addition, the image reading lens system 51 is configured so that two positive lenses, that is, the fourth lens L4 and the fifth lens L5 are disposed on the image side of the aperture diaphragm S6. Thus, it is possible to further satisfactorily correct the spherical aberration.

The image reading lens system 51 is configured so that the fourth lens L4 is formed of the positive aspheric lens made of resin, and the sixth lens L6 is formed of the negative aspheric lens made of resin. Thus, even if a temperature of the whole image reading lens system 51 is changed due to continuous use of the image reading apparatus, focus movement due to temperature variation of the fourth lens L4 and focus movement due to temperature variation of the sixth lens L6 substantially cancel each other out. As a result, focus movement scarcely occurs in terms of the whole image reading lens system 51.

As can be seen from Table 15, the image reading lens system 51 satisfies the above-mentioned conditional expressions (1) to (5). Therefore, it is possible to suppress various aberrations with an excellent balance even in the wide angle range where a half angle of view ω is greater than 25 degrees.

EXAMPLE 6

Figure 17:
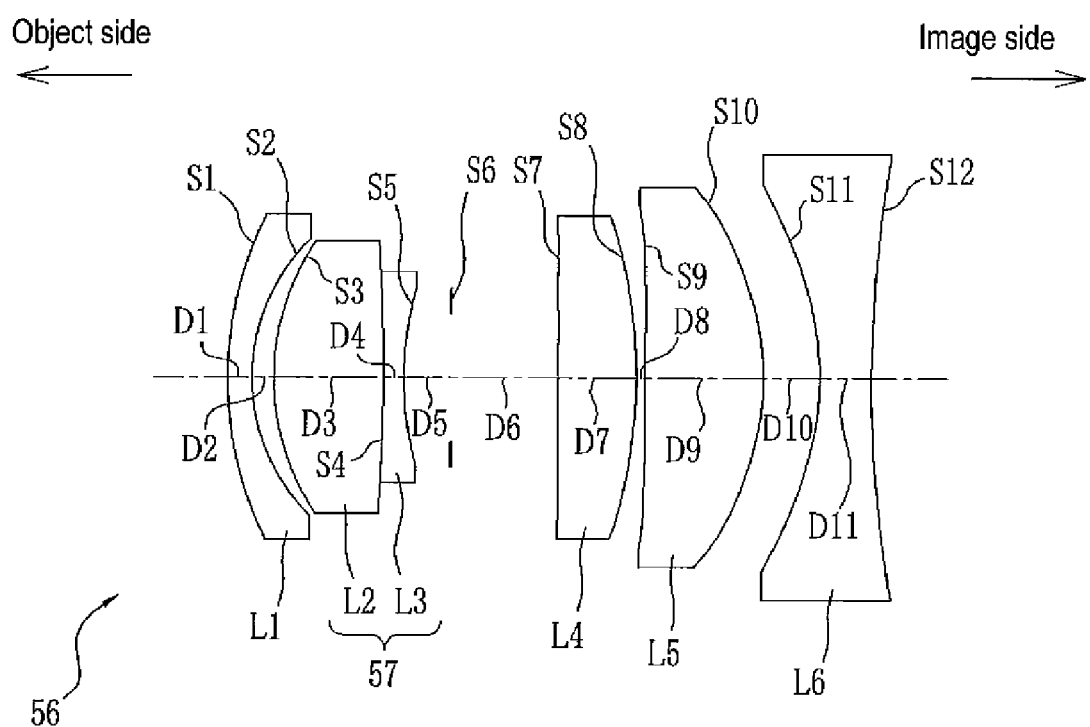
FIG. 17 is a section view illustrating an image reading lens system according to Example 6.

As shown in FIG. 17, an image reading lens system 56 according to Example 6 includes six lenses having first to sixth lenses L1 to L6 that are arranged in order from the object side and an aperture diaphragm 86. The aperture diaphragm S6 is disposed between the third lens L3 and the fourth lens L4. Specifically, in the image reading lens system 56, there are arranged, in order from the object side, a front group (the first lens L1, the second lens L2, and the third lens L3), the aperture diaphragm S6, and a rear group (the fourth lens L4, the fifth lens L5, and the sixth lens L6). In addition, the second lens L2 and the third lens L3 form a cemented lens 57.

In the image reading lens system 56, the first lens L1, the third lens L3, and the sixth lens L6 are formed of negative lenses, and the second lens L2, the fourth lens L4, and the fifth lens L5 are formed of positive lenses.

TABLE 16

| Si (Surface number) | Ri (Radius of curvature) | Di (Surface spacing) | Ndj (Refractive index) | νdj (Abbe number) |
|---|---|---|---|---|
| 1 | 14.62 | 1.00 | 1.58144 | 40.7 |
| 2 | 7.74 | 0.87 | | |
| 3 | 9.69 | 4.45 | 1.83481 | 42.7 |
| 4 | −86.44 | 0.82 | 1.74077 | 27.8 |
| 5 | 12.99 | 1.91 | | |
| 6 | (AD*) | 4.24 | | |
| 7 | −480.05 | 3.22 | 1.83400 | 37.2 |
| 8 | −21.41 | 0.34 | | |
| 9* | −344.63 | 4.77 | 1.53112 | 55.4 |
| 10* | −10.39 | 2.28 | | |
| 11* | −11.00 | 2.10 | 1.58364 | 30.2 |
| 12* | 61.39 | | | |

| | |
|---|---|
| Focal length of the whole system f (mm) | 27.0 |
| F number | 4.5 |
| Imaging magnification β | −0.111 |
| Angle of view 2ω (degrees) | 58.2 |

*AD: Aperture diaphragm

As shown in Table 16, each lens in the image reading lens system 56 has different material. The first lens L1, the second lens L2, the third lens L3, and the fourth lens L4 are made of glass, and surfaces of all these lenses are formed of spherical surfaces. On the other hand, in the image reading lens system 56, the fifth lens L5 and the sixth lens L6 are made of resin, and the surfaces S9 and S10 of the fifth lens L5 and the surfaces S11 and S12 of the sixth lens L6 are formed of aspheric surfaces.

TABLE 17

| Aspheric coefficient | 9th surface (S9) | 10th surface (S10) | 11th surface (S11) | 12th surface (S12) |
|---|---|---|---|---|
| KA | 1.000E+00 | 4.519E−02 | 2.479E−02 | −1.000E+00 |
| $B_3$ | 2.329E−05 | 4.550E−04 | 8.766E−04 | 3.050E−04 |
| $B_4$ | 1.290E−05 | 6.982E−05 | 6.974E−06 | −5.642E−06 |
| $B_5$ | −3.263E−06 | −1.775E−06 | 1.096E−05 | −4.800E−06 |
| $B_6$ | 1.538E−07 | 9.245E−08 | −1.635E−06 | 3.268E−07 |
| $B_7$ | −5.566E−08 | −8.982E−08 | −1.126E−07 | 1.813E−08 |
| $B_8$ | −1.877E−08 | −1.717E−08 | 8.231E−09 | 6.886E−10 |
| $B_9$ | −1.220E−09 | −1.320E−09 | 1.662E−09 | 1.157E−10 |
| $B_{10}$ | 7.879E−11 | 1.627E−10 | −4.373E−11 | −2.390E−11 |

Similarly to the image reading lens system 31 according to Example 1, specific shapes of the aspheric surfaces S9 to S12 of the fifth lens L5 and sixth lens L6 are represented by the numerical expression 1 mentioned above. Specific aspheric coefficients of the surfaces S9 to S12 of the image reading lens system 56 are shown in Table 17.

TABLE 18

| (1) f1/f | −1.10 |
|---|---|
| (2) f5/f | 0.739 |
| (3) R3/f | 0.36 |
| (4) D8/f | 0.12 |
| (5) D11/f | 0.08 |

As shown in Table 18, the image reading lens system 56 has the following specifications: f1/f=−1.10, f5/f=0.739, R3/f=0.36, D8/f=0.12, and D11/f=0.08. That is, the image reading lens system is configured to satisfy the above-mentioned conditional expressions (1) to (5).

Figure 18:
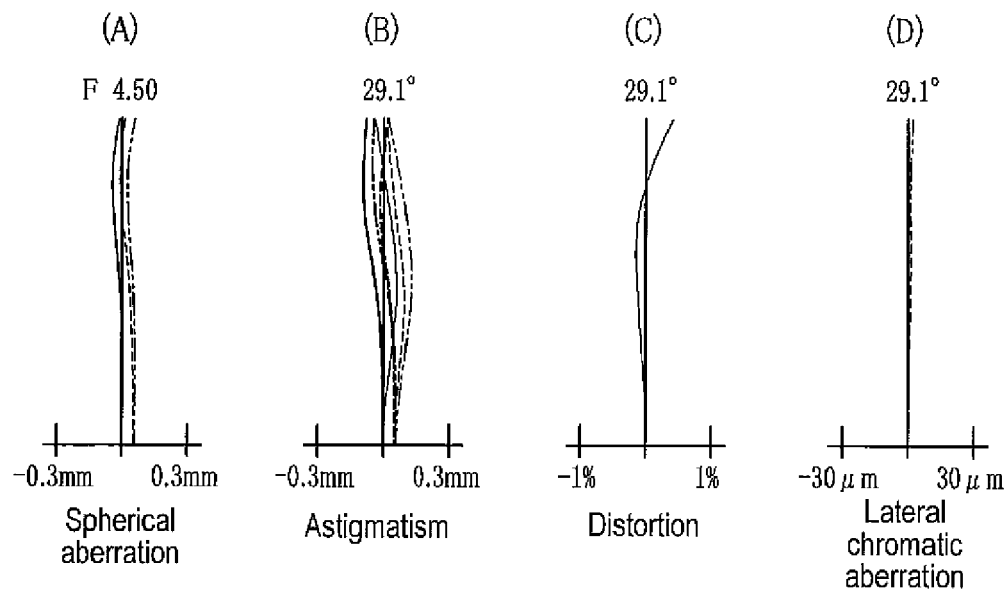
FIG. 18 is an aberration diagram illustrating the spherical aberration, astigmatism, distortion, and lateral chromatic aberration of the image reading lens system according to Example 6.
Figure 19:
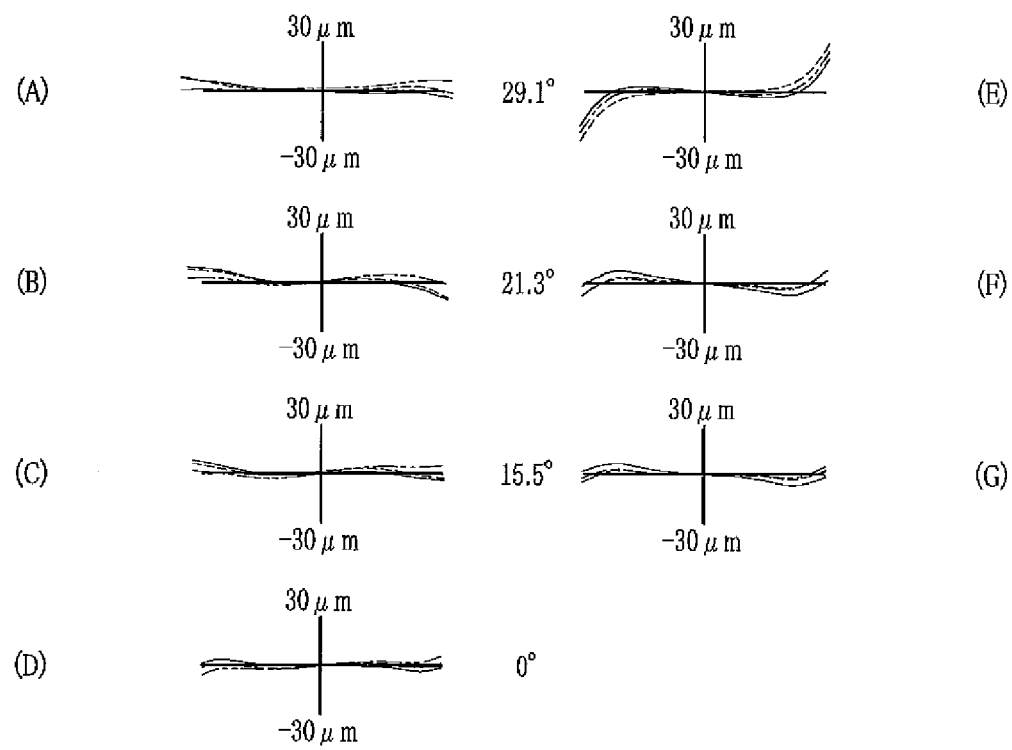
FIG. 19 is an aberration diagram illustrating the comatic aberration of the image reading lens system according to Example 6.

FIG. 18 shows the spherical aberration, the astigmatism, the distortion, and the lateral chromatic aberration of the image reading lens system 56. In addition, FIGS. 19(A) to 19(D) show the tangential coma aberrations (aberration in T direction) at a half angle of view ω (degrees)=29.1, 21.3, 15.5, and 0, respectively. Likewise, FIGS. 19(E) to 19(G) show the sagittal coma aberrations (aberration in S direction) at a half angle of view ω (degrees)=29.1, 21.3, and 15.5, respectively. Furthermore, notation of these various aberration diagrams of the image reading lens system 56 is also similar to Example 1.

The image reading lens system 56 is configured so that the fifth lens L5 and the sixth lens L6 are formed of the aspheric lenses, and the first lens L1 has the negative refractive power. Thereby, it is possible to provide a wide-angle lens having a half angle of view greater than 25 degrees and having the compact configuration of the six lenses and an the aperture diaphragm. Moreover, as seen from the lens data (Tables 16 to 18) and aberration diagrams (FIGS. 18 and 19), the image reading lens system 56 is configured so that the fifth lens L5 and the sixth lens L6 are made of resin, and the surfaces of these lenses made of resin are formed of the aspheric surfaces. Thus, it is possible to suppress various aberrations with an excellent balance even in the wide angle range where a half angle of view ω is greater than 25 degrees.

Furthermore, the image reading lens system 56 is configured so that the first lens L1 and the sixth lens L6 are formed of the negative lenses. Thus, it is possible to achieve compactness while satisfactorily correcting the field curvature.

Further the image reading lens system 56 is configured so that fifth lens L5 is formed of the positive aspheric lens made of resin. Thus, as compared with the case where another lens in the system is formed of a positive aspheric lens made of resin, it is possible to more satisfactorily correct the spherical aberration.

Moreover, the image reading lens system 56 is configured so that a refractive power of the fifth lens L5 becomes large and a refractive power of the fourth lens L4 formed of the spherical lens becomes small. Thereby, it is possible to more satisfactorily correct the field curvature, as compared with a different image reading lens system (for example, the image reading lens system 36 in Example 2) having the fifth lens L5 formed of a positive aspheric lens made of resin, and the sixth lens L6 formed of a negative aspheric lens made of resin.

In addition, the image reading lens system 56 is configured so that the sixth lens L6 is formed of the negative aspheric lens made of resin. Thus, as compared with the case where another lens in the system is formed of a negative aspheric lens made of resin, it is possible to more satisfactorily correct the spherical aberration.

The image reading lens system 56 is configured so that a cemented lens 57 is formed by cementing the second lens L2 and the third lens L3, and is disposed adjacent to the aperture diaphragm S6. Thus, it is possible to satisfactorily correct the longitudinal chromatic aberration. In addition, the image reading lens system 56 is configured so that two positive lenses, that is, the fourth lens L4 and the fifth lens L5 are disposed on the image side of the aperture diaphragm S6. Thus, it is possible to further satisfactorily correct the spherical aberration.

Furthermore the image reading lens system 56 is configured so that the fifth lens L5 is formed of the positive aspheric lens made of resin, and the sixth lens L6 is formed of the negative aspheric lens made of resin. Thus, even if a temperature of the whole image reading lens system 56 is changed due to continuous use of the image reading apparatus, focus movement due to temperature variation of the fifth lens L5 and focus movement due to temperature variation of the sixth lens L6 substantially cancel each other out. As a result, focus movement scarcely occurs in terms of the whole image reading lens system 56.

As can be seen from Table 18, the image reading lens system 56 satisfies the above-mentioned conditional expressions (1) to (5). Therefore, it is possible to suppress various aberrations with an excellent balance even in the wide angle range where a half angle of view ω is greater than 25 degrees.

EXAMPLE 7

Figure 20:
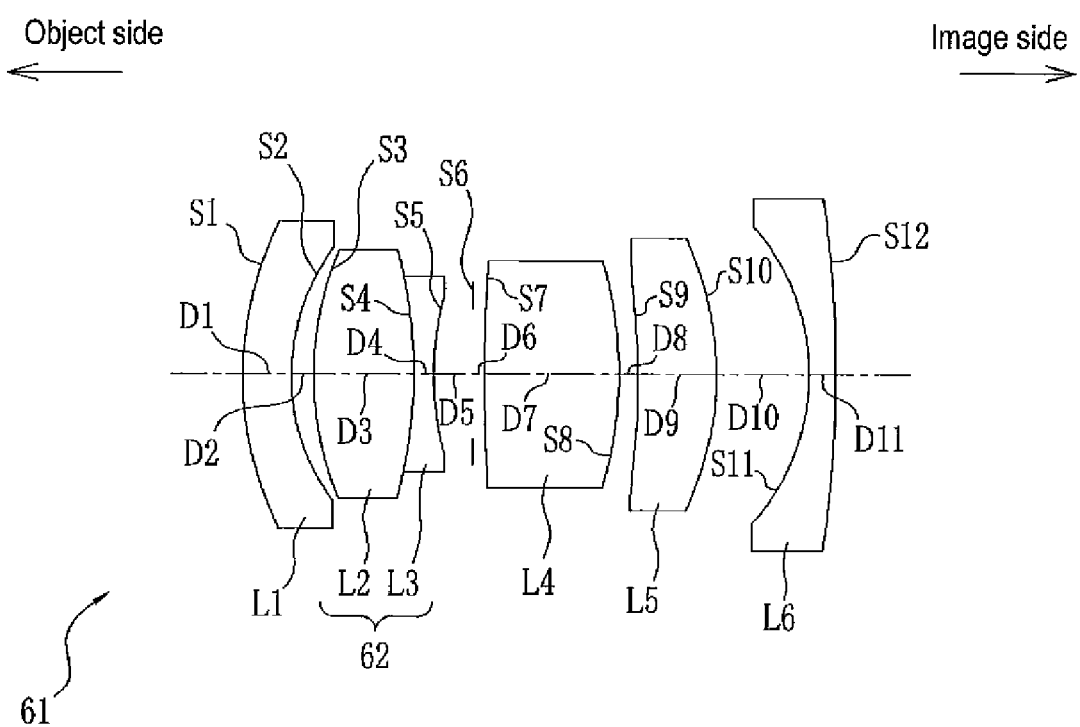
FIG. 20 is a section view illustrating an image reading lens system according to Example 7.

As shown in FIG. 20, an image reading lens system 61 according to Example 7 includes six lenses having first to sixth lenses L1 to L6 that are arranged in order from the object side and an aperture diaphragm S6. The aperture diaphragm S6 is disposed between the third lens L3 and the fourth lens L4. Specifically, in the image reading lens system 61, there are arranged, in order from the object side, a front group (the first lens L1, the second lens L2, and the third lens L3), the aperture diaphragm S6, and a rear group (the fourth lens L4, the fifth lens L5, and the sixth lens L6). In addition, the second lens L2 and the third lens L3 form a cemented lens 62.

In the image reading lens system 61, the first lens L1, the third lens L3, and the sixth lens L6 are formed of negative lenses, and the second lens L2, the fourth lens L4, and the fifth lens L5 are formed of positive lenses.

TABLE 19

| Si (Surface number) | Ri (Radius of curvature) | Di (Surface spacing) | Ndj (Refractive index) | vdj (Abbe number) |
|---|---|---|---|---|
| 1* | 12.78 | 2.00 | 1.58364 | 30.2 |
| 2* | 8.84 | 0.91 | | |
| 3 | 13.18 | 4.02 | 1.71300 | 53.9 |
| 4 | −20.71 | 0.79 | 1.62004 | 36.3 |
| 5 | 11.83 | 1.60 | | |
| 6 | (AD*) | 0.46 | | |
| 7 | 65.66 | 5.42 | 1.83481 | 42.7 |
| 8 | −16.74 | 0.76 | | |
| 9* | −27.78 | 3.18 | 1.53112 | 55.4 |
| 10* | −11.71 | 3.79 | | |
| 11 | −8.89 | 1.06 | 1.62588 | 35.7 |
| 12 | −49.87 | | | |

Focal length of the whole system f (mm) 26.9
F number 4.5
Imaging magnification β −0.111
Angle of view 2ω (degrees) 57.6
*AD: Aperture diaphragm As shown in Table 19, each lens in the image reading lens system 61 has different material. The second lens L2, the third lens L3, the fourth lens L4, and the sixth lens L6 are made of glass, and surfaces of all these lenses are formed of spherical surfaces. On the other hand, in the image reading lens system 61, the first lens L1 and the fifth lens L5 are made of resin, and the surfaces S1 and S2 of the first lens L1 and the surfaces S9 and S10 of the fifth lens L5 are formed of aspheric surfaces.

TABLE 20

| Aspheric coefficient | 1st surface (S1) | 2nd surface (S2) | 9th surface (S9) | 10th surface (S10) |
|---|---|---|---|---|
| KA | 5.574E−01 | 7.631E−01 | −1.000E+00 | 4.932E−01 |
| $B_3$ | −3.826E−05 | −1.699E−05 | 1.621E−04 | 1.636E−04 |
| $B_4$ | −1.315E−06 | 1.166E−04 | 6.916E−05 | −4.546E−05 |
| $B_5$ | −1.034E−06 | 8.320E−06 | 4.165E−05 | 2.681E−05 |
| $B_6$ | 2.960E−07 | 1.858E−06 | −3.941E−06 | −7.745E−07 |
| $B_7$ | −8.591E−08 | −5.070E−08 | −4.525E−08 | −6.014E−07 |
| $B_8$ | −1.481E−08 | −7.168E−08 | 7.164E−08 | 5.121E−08 |
| $B_9$ | −6.827E−09 | −1.452E−08 | 2.720E−08 | 2.321E−08 |
| $B_{10}$ | 8.089E−10 | 3.061E−09 | −3.853E−09 | −1.877E−09 |

Similarly to the image reading lens system 31 according to Example 1, specific shapes of the aspheric surfaces S1, S2, S9, and S10 of the first lens L1 and fifth lens L5 are represented by the numerical expression 1 mentioned above. Specific aspheric coefficients of the surfaces S1, S2, S9, and S10 of the image reading lens system 61 are shown in Table 20.

TABLE 21

| (1) f1/f | −2.22 |
|---|---|
| (2) f5/f | 1.319 |
| (3) R3/f | 0.49 |
| (4) D8/f | 0.20 |
| (5) D11/f | 0.14 |

As shown in Table 21, the image reading lens system 61 has the following specifications: f1/f=−2.22, f5/f=1.319, R3/f=0.49, D18/f=0.20, and D11/f=0.14. That is, the image reading lens system is configured to satisfy the above-mentioned conditional expressions (1) to (5).

Figure 21:
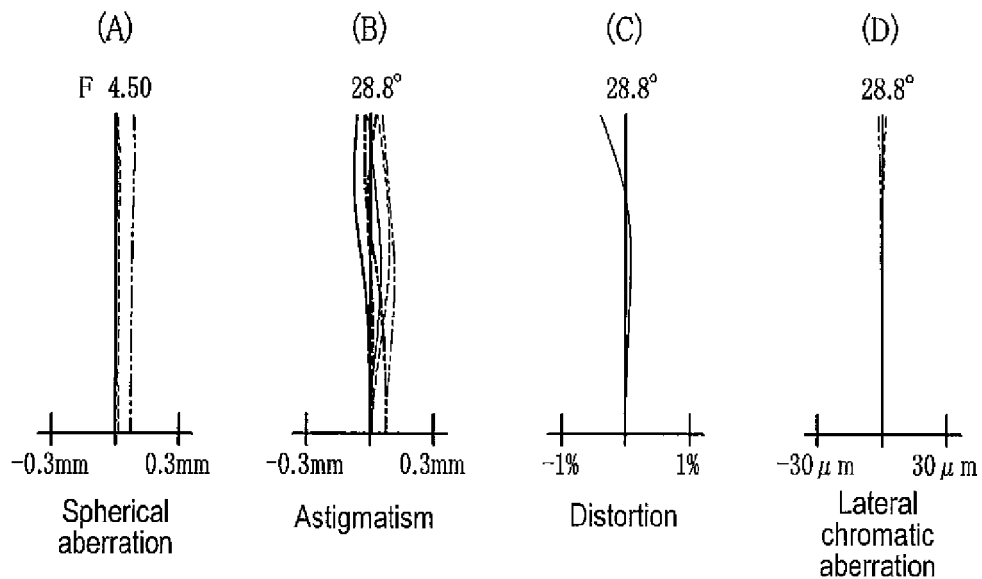
FIG. 21 is an aberration diagram illustrating the spherical aberration, astigmatism, distortion, and lateral chromatic aberration of the image reading lens system according to Example 7.
Figure 22:
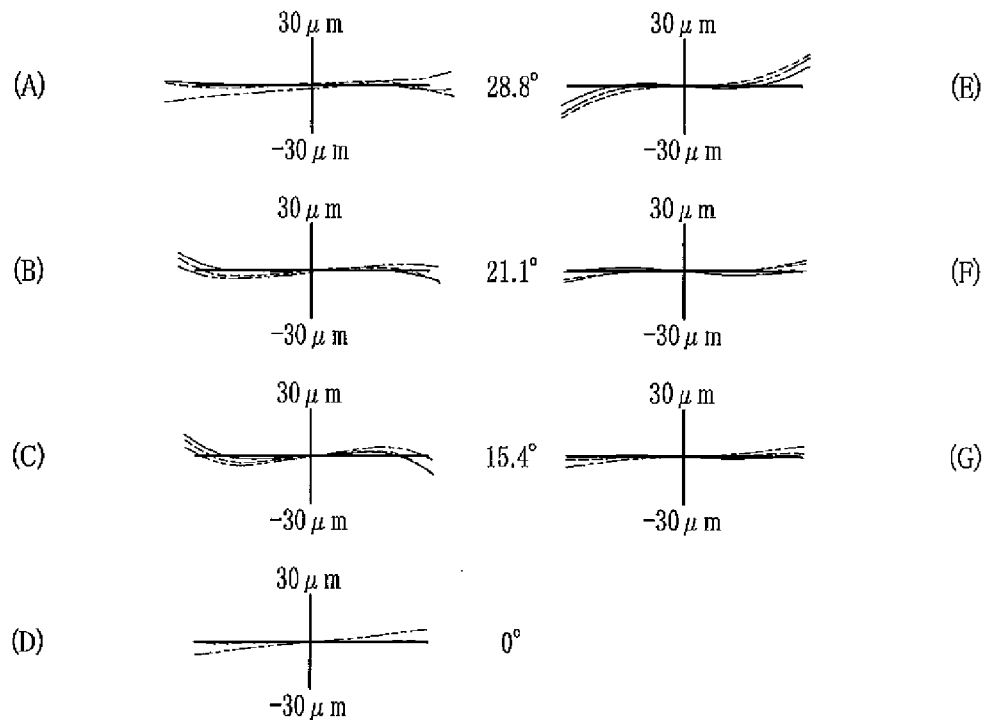
FIG. 22 is an aberration diagram illustrating the comatic aberration of the image reading lens system according to Example 7.

FIG. 21 shows the spherical aberration, the astigmatism, the distortion, and the lateral chromatic aberration of the image reading lens system 61. In addition, FIGS. 22(A) to 22(D) show the tangential coma aberrations (aberration in T direction) at a half angle of view ω (degrees)=28.8, 21.1, 15.4, and 0, respectively. Likewise, FIGS. 22(E) to 22(G) show the sagittal coma aberrations (aberration in S direction) at a half angle of view ω (degrees)=28.8, 21.1, and 15.4, respectively. Furthermore, notation of these various aberration diagrams of the image reading lens system 61 is also similar to Example 1.

The image reading lens system 61 is configured so that the first lens L1 and the fifth lens L5 are formed of the aspheric lenses, and the first lens L1 has the negative refractive power. Thereby, it is possible to provide a wide-angle lens having a half angle of view greater than 25 degrees and having the compact configuration of the six lenses and the aperture diaphragm. Moreover, as seen from the lens data (Tables 19 to 21) and aberration diagrams (FIGS. 21 and 22), the image reading lens system 61 is configured so that the first lens L1 and the fifth lens L5 are made of resin, and the surfaces of these lenses made of resin are formed of the aspheric surfaces. Thus, it is possible to suppress various aberrations with an excellent balance even in the wide angle range where a half angle of view ω is greater than 25 degrees.

Furthermore, the image reading lens system 61 is configured so that the first lens L1 and the sixth lens L6 are formed of the negative lenses. Thus, it is possible to achieve compactness while satisfactorily correcting the field curvature.

Moreover, the image reading lens system 61 is configured so that a center thickness of the fourth lens L4 becomes large. Thereby, it is possible to more satisfactorily correct the lateral chromatic aberration, as compared with a different image reading lens system (for example, the image reading lens system 41 in Example 3) having the first lens L1 formed of a negative aspheric lens made of resin and the fifth lens L5 formed of a positive aspheric lens made of resin.

In addition, the image reading lens system 61 is configured so that first lens L1 is formed of the negative aspheric lens made of resin. Thus, it is possible to allow a size of the first lens L1 to be smaller than that of the sixth lens L6 when the sixth lens L6 is formed of a negative aspheric lens made of resin. As a result, it becomes easy to suppress manufacturing error in molding.

Further, the image reading lens system 61 is configured so that fifth lens L5 is formed of the positive aspheric lens made of resin. Thus, as compared with the case where another lens in the system is formed of a positive aspheric lens made of resin, it is possible to more satisfactorily correct the spherical aberration.

The image reading lens system 61 is configured so that a cemented lens 62 is formed by cementing the second lens L2 and the third lens L3, and is disposed adjacent to the aperture diaphragm S6. Thus, it is possible to satisfactorily correct the longitudinal chromatic aberration. In addition, the image reading lens system 61 is configured so that two positive lenses, that is, the fourth lens L4 and the fifth lens L5 are disposed on the image side of the aperture diaphragm S6. Thus, it is possible to further satisfactorily correct the spherical aberration.

The image reading lens system 61 is configured so that the first lens L1 is formed of the negative aspheric lens made of resin, and the fifth lens L5 is formed of the positive aspheric lens made of resin. Thus, even if a temperature of the whole image reading lens system 61 is changed due to continuous use of the image reading apparatus, focus movement due to temperature variation of the first lens L1 and focus movement due to temperature variation of the fifth lens L5 substantially cancel each other out. As a result, focus movement scarcely occurs in terms of the whole image reading lens system 61.

As can be seen from Table 21, the image reading lens system 61 satisfies the above-mentioned conditional expressions (1) to (5). Therefore, it is possible to suppress various aberrations with an excellent balance even in the wide angle range where a half angle of view ω is greater than 25 degrees.

EXAMPLE 8

Figure 23:
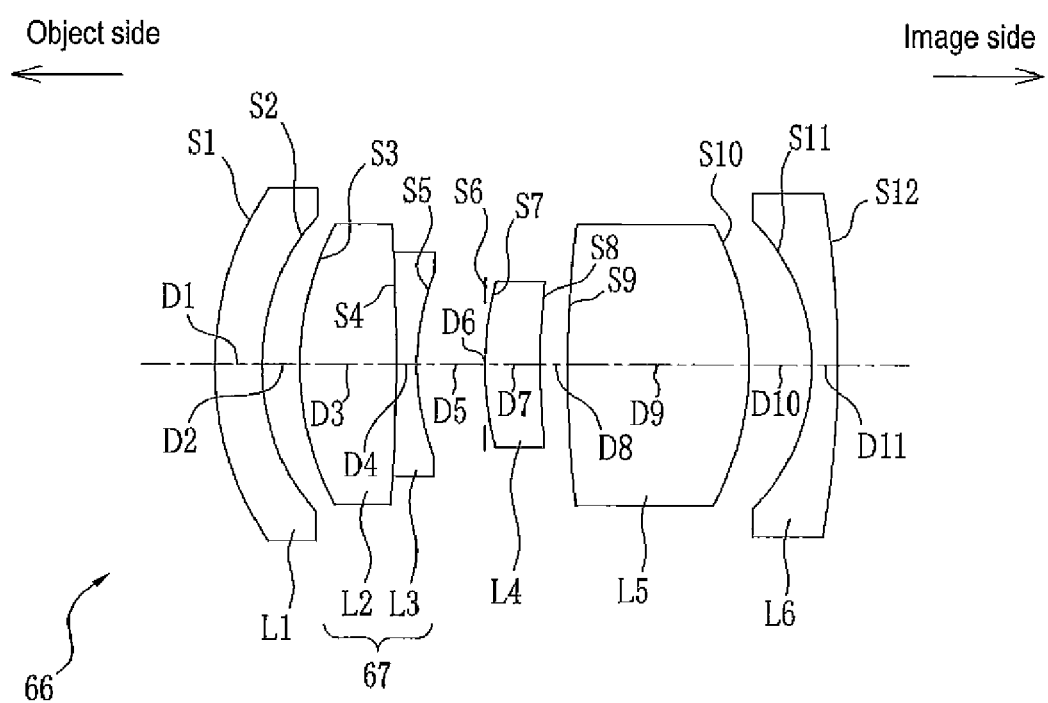
FIG. 23 is a section view illustrating an image reading lens system according to Example 8.

As shown in FIG. 23, an image reading lens system 66 according to Example 8 includes six lenses having first to sixth lenses L1 to L6 that are arranged in order from the object side and an aperture diaphragm S6. The aperture diaphragm S6 is disposed between the third lens L3 and the fourth lens L4. Specifically, in the image reading lens system 66, there are arranged in order from the object side, a front group (the first lens L1, the second lens L2, and the third lens L3), the aperture diaphragm S6, and a rear group (the fourth lens L4, the fifth lens L5, and the sixth lens L6). In addition, the second lens L2 and the third lens L3 form a cemented lens 67.

In the image reading lens system 66, the first lens L1, the third lens L3, and the sixth lens L6 are formed of negative lenses, and the second lens L2, the fourth lens L4, and the fifth lens L5 are formed of positive lenses.

TABLE 22

| Si (Surface number) | Ri (Radius of curvature) | Di (Surface spacing) | Ndj (Refractive index) | vdj (Abbe number) |
|---|---|---|---|---|
| 1* | 13.68 | 1.97 | 1.58364 | 30.2 |
| 2* | 10.15 | 1.60 | | |
| 3 | 12.62 | 4.02 | 1.83481 | 42.7 |
| 4 | −91.82 | 0.86 | | |
| 5 | 10.24 | 2.85 | 1.69895 | 30.1 |
| 6 | (AD*) | 0.00 | | |
| 7* | 14.02 | 2.26 | 1.53112 | 55.4 |
| 8* | 23.67 | 1.18 | | |
| 9 | 48.77 | 7.56 | 1.83481 | 42.7 |
| 10 | −12.47 | 2.63 | | |
| 11 | −8.45 | 1.07 | 1.68893 | 31.1 |
| 12 | −42.83 | | | |

| | |
|---|---|
| Focal length of the whole system f (mm) | 27.0 |
| F number | 4.5 |
| Imaging magnification β | −0.111 |
| Angle of view 2ω (degrees) | 57.6 |

*AD: Aperture diaphragm

As shown in Table 22, each lens in the image reading lens system 66 has different material. The second lens L2, the third lens L3, the fifth lens L5, and the sixth lens L6 are made of glass, and surfaces of all these lenses are formed of spherical surfaces. On the other hand, in the image reading lens system 66, the first lens L1 and the fourth lens L4 are made of resin, and the surfaces S1 and S2 of the first lens L1 and the surfaces S7 and S8 of the fourth lens L4 are formed of aspheric surfaces.

TABLE 23

| Aspheric coefficient | 1st surface (S1) | 2nd surface (S2) | 7th surface (S7) | 8th surface (S8) |
|---|---|---|---|---|
| KA | 9.513E−01 | 9.999E−01 | −1.000E+00 | −1.000E+00 |
| $B_3$ | −1.779E−04 | −3.137E−04 | 3.122E−04 | 2.075E−04 |
| $B_4$ | 6.039E−05 | 1.885E−04 | −3.263E−04 | −2.596E−04 |
| $B_5$ | 7.140E−06 | 2.556E−06 | 1.117E−04 | 5.192E−05 |
| $B_6$ | −5.379E−07 | −1.013E−06 | 1.984E−05 | 1.587E−06 |
| $B_7$ | −1.180E−07 | 4.292E−08 | −1.256E−06 | −1.203E−06 |
| $B_8$ | −1.993E−09 | −2.050E−08 | −2.637E−06 | −3.390E−07 |
| $B_9$ | 1.224E−09 | −5.041E−09 | −8.595E−07 | −3.308E−08 |
| $B_{10}$ | −4.427E−11 | 1.053E−09 | 3.413E−07 | 2.713E−08 |

Similarly to the image reading lens system 31 according to Example 1, specific shapes of the aspheric surfaces S1, S2, S7, and S8 of the first lens L1 and fourth lens L4 are represented by the numerical expression 1 mentioned above. Specific aspheric coefficients of the surfaces S1, S2, S7, and S8 of the image reading lens system 66 are shown in Table 23.

TABLE 24

| | |
|---|---|
| (1) f1/f | −3.11 |
| (2) f5/f | 0.464 |
| (3) R3/f | 0.47 |
| (4) D8/f | 0.08 |
| (5) D11/f | 0.10 |

As shown in Table 24, the image reading lens system 66 has the following specification: f1/f=−3.11, f5/f=0.464, R3/f=0.47, D8/f=0.08, and D11/f=0.10. That is, the image reading lens system is configured to satisfy the above-mentioned conditional expressions (1) to (5).

Figure 24:
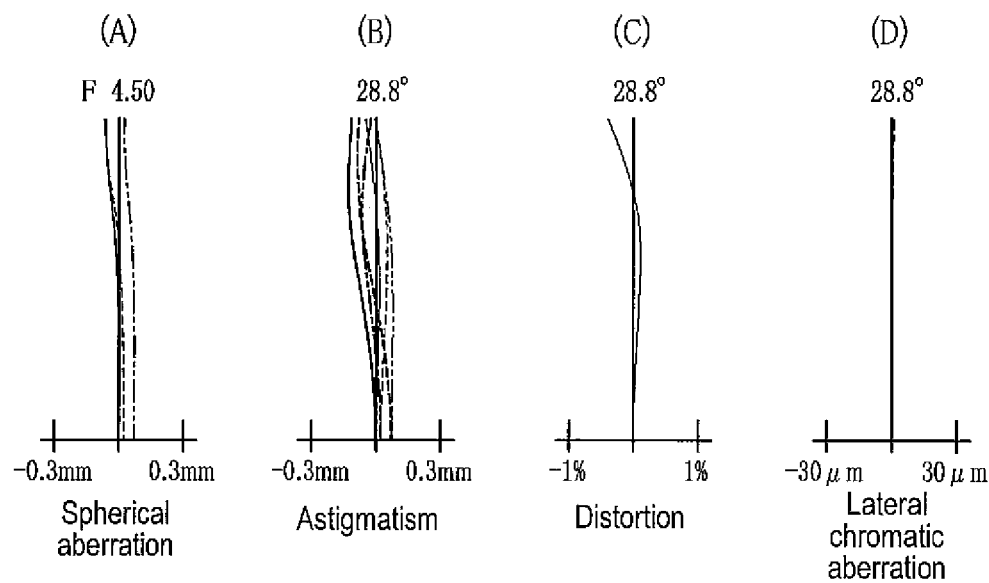
FIG. 24 is an aberration diagram illustrating the spherical aberration, astigmatism, distortion, and lateral chromatic aberration of the image reading lens system according to Example 8.
Figure 25:
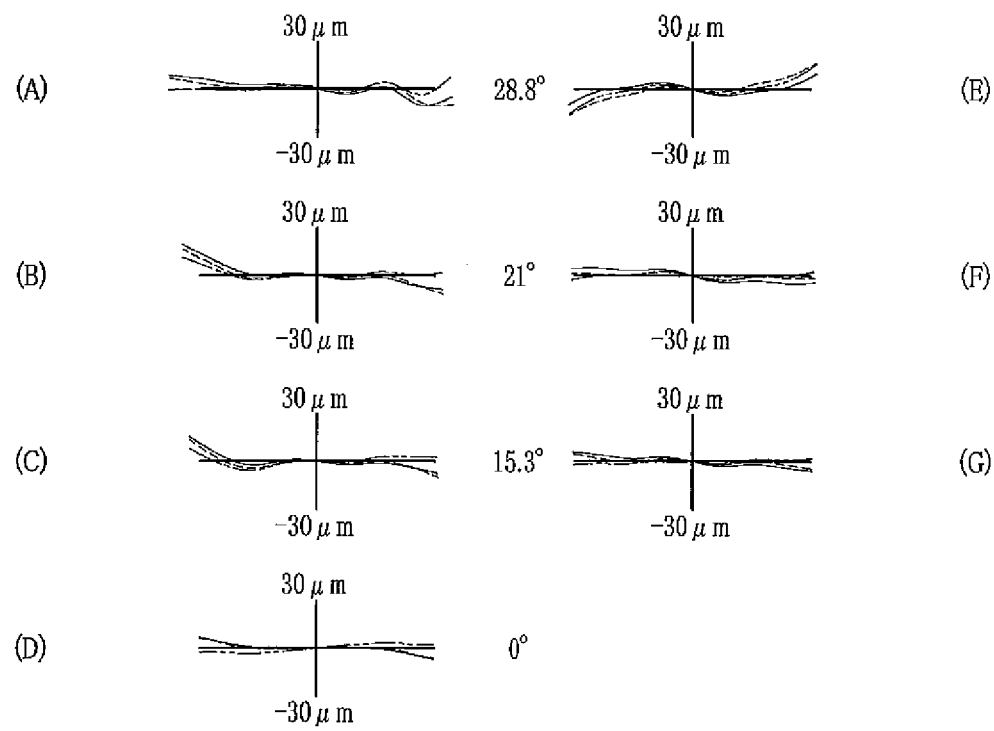
FIG. 25 is an aberration diagram illustrating the comatic aberration of the image reading lens system according to Example 8.

FIG. 24 shows the spherical aberration, the astigmatism, the distortion, and the lateral chromatic aberration of the image reading lens system 66. In addition, FIGS. 25(A) to 25(D) show the tangential coma aberrations (aberration in T direction) at a half angle of view ω (degrees)=28.8, 21, 15.3, and 0, respectively. Likewise, FIGS. 25(E) to 25(G) show the sagittal coma aberrations (aberration in S direction) at a half angle of view ω(degrees)=28.8, 21, and 15.3, respectively. Furthermore, notation of these various aberration diagrams of the image reading lens system 66 is also similar to Example 1.

The image reading lens system 66 is configured so that the first lens L1 and the fourth lens L4 are formed of the aspheric lenses, and the first lens L1 has the negative refractive power. Thereby, it is possible to provide a wide-angle lens having a half angle of view greater than 25 degrees and having the compact configuration of the six lenses and the aperture diaphragm. Moreover, as seen from the lens data (Tables 22 to 24) and aberration diagrams (FIGS. 24 and 25), the image reading lens system 66 is configured so that the first lens L1 and the fourth lens L4 are made of resin, and the surfaces of the lenses made of resin are formed of the aspheric surfaces. Thus, it is possible to suppress various aberrations with an excellent balance even in the wide angle range where a half angle of view ω is greater than 25 degrees.

Furthermore, the image reading lens system 66 is configured so that the first lens L1 and the sixth lens L6 are formed of the negative lenses. Thus, it is possible to achieve compactness while satisfactorily correcting the field curvature.

In addition, the image reading lens system 66 is configured so that first lens L1 is formed of the negative aspheric lens made of resin. Thus, it is possible to allow a size of the first lens L1 to be smaller than that of the sixth lens L6 when the sixth lens L6 is formed of a negative aspheric lens made of resin. As a result, it becomes easy to suppress manufacturing error in molding.

Moreover, the image reading lens system 66 is configured so that a refractive power of the first lens L1 becomes small. Thereby, it is possible to more satisfactorily correct the comatic aberration, as compared with a different image reading lens system (for example, the image reading lens system 46 in Example 4) having the first lens L1 formed of a negative aspheric lens made of resin and the fourth lens L4 formed of a positive aspheric lens made of resin.

Further, the image reading lens system 66 is configured so that fourth lens L4 is formed of the positive aspheric lens made of resin. Thus, as compared with the case where another lens in the system is formed of a positive aspheric lens made of resin, it is possible to more satisfactorily correct the field curvature.

The image reading lens system 66 is configured so that a cemented lens 67 is formed by cementing the second lens L2 and the third lens L3, and is disposed adjacent to the aperture diaphragm S6. Thus, it is possible to satisfactorily correct the longitudinal chromatic aberration. In addition, the image reading lens system 66 is configured so that two positive lenses, that is, the fourth lens L4 and the fifth lens L5 are disposed on the image side of the aperture diaphragm S6. Thus, it is possible to further satisfactorily correct spherical aberration.

However, the image reading lens system 66 is configured so that the first lens L1 is formed of the negative aspheric lens made of resin, and the fourth lens L4 is formed of the positive aspheric lens made of resin. Thus, even if a temperature of the whole image reading lens system 66 is changed due to continuous use of the image reading apparatus, focus movement due to temperature variation of the first lens L1 and focus movement due to temperature variation of the fourth lens L4 substantially cancel each other out. As a result, focus movement scarcely occurs in terms of the whole image reading lens system 66.

As can be seen from Table 24, the image reading lens system 66 is configured to satisfy the above-mentioned conditional expressions (1) to (5). Therefore, it is possible to suppress various aberrations with an excellent balance even in the wide angle range where a half angle of view ω is greater than 25 degrees.

Furthermore, in Examples 1 to 8 mentioned above, the image reading lens systems having focal lengths f of 27.0 to 31.9 (mm) appropriate for the image scanner for reading an original having a size of A3 have been exemplarily described. However, the invention is not limited thereto. Even if the image reading lens system is used to read an original having a size other than the size of A3, it may be preferable to adjust magnification of the image reading lens system in accordance with a size and a direction of an original to be read.

In addition, in the above-mentioned examples, lens data such as Abbe numbers and refractive indexes of lenses, and on-axis surface spacings and radiuses of curvature of lens surfaces are given as specific values. However, the lens data used in the image reading lens systems are not limited to the numerical values in the examples, and may be different values.

What is claimed is:

1. An image reading lens system consisting of:
   six lenses including a first lens, a second lens, a third lens, a fourth lens, a fifth lens, and a sixth lens that are arranged in order from an object side; and
   a stop, wherein
   the six lenses include
      a negative lens that is made of a resin and has at least one aspheric surface, and
      a positive lens that is made of a resin and has at least one aspheric surface,
   the six lenses include a cemented lens that is adjacent to the stop and is formed by cementing a positive lens and a negative lens that are adjacent to each other, and
   the first lens has a negative refractive power, wherein
   the stop is disposed between the third lens and the fourth lens,
   the third lens has a negative refractive power,
   the second lens, the fourth lens, and the fifth lens have positive refractive powers, respectively, and
   the cemented lens is formed of the second lens and the third lens.

2. The image reading lens system according to claim 1, wherein the sixth lens has a negative refractive power.

3. The image reading lens system according to claim 1, wherein the first lens is the negative lens, which is made of the resin and has the at least one aspheric surface.

4. The image reading lens system according to claim 1, wherein the sixth lens is the negative lens, which is made of the resin and has the at least one aspheric surface.

5. The image reading lens system according to claim 1, wherein the fourth lens is the positive lens, which is made of the resin and has the at least one aspheric surface.

6. The image reading lens system according to claim 1, wherein the fifth lens is the positive lens, which is made of the resin and has the at least one aspheric surface.

7. The image reading lens system according to claim 1, wherein the following conditional expression is satisfied:

$$-3.37 < f1/f < -0.85$$

where
   f denotes a focal length of the whole system, and
   f1 denotes a focal length of the first lens.

8. The image reading lens system according to claim 1, wherein the following conditional expression is satisfied:

$$0.32 < f5/f < 1.74$$

where
   f denotes a focal length of the whole system, and
   f5 denotes a focal length of the fifth lens.

9. The image reading lens system according to claim 1, wherein the following conditional expression is satisfied:

$$0.29 < R3/f < 0.67$$

where
   f denotes a focal length of the whole system, and
   R3 denotes a radius of curvature of an object-side surface of the second lens.

10. The image reading lens system according to claim 1, wherein the following conditional expression is satisfied:

$$0.04 < D8/f < 0.28$$

where
   f denotes a focal length of the whole system, and
   D8 denotes a center thickness of the fourth lens.

11. The image reading lens system according to claim 1, wherein the following conditional expression is satisfied:

$$0.02 < D11/f < 0.45$$

where
   f denotes a focal length of the whole system, and
   D11 denotes a space from an image-side surface of the fifth lens to an object-side surface of the sixth lens on the optical axis.

12. An image reading apparatus comprising:
   the image reading lens system according to claim 1.

* * * * *